US009928789B2

(12) United States Patent
Takahashi et al.

(10) Patent No.: US 9,928,789 B2
(45) Date of Patent: Mar. 27, 2018

(54) DISPLAY HAVING FIXED FRAME-RATE UP CONVERSION FOLLOWED BY VARIABLE FRAME-RATE DOWN CONVERSION, WHEREIN FRAME DECIMATION IS CARRIED OUT ACCORDING TO FRAME ID NUMBER

(75) Inventors: Masayuki Takahashi, Kanagawa (JP); Koichi Sono, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 529 days.

(21) Appl. No.: 13/547,242

(22) Filed: Jul. 12, 2012

(65) Prior Publication Data

US 2013/0021387 A1    Jan. 24, 2013

(30) Foreign Application Priority Data

Jul. 19, 2011   (JP) ................. 2011-158039

(51) Int. Cl.
G09G 3/36 (2006.01)
H04N 7/12 (2006.01)
H04N 21/4402 (2011.01)

(52) U.S. Cl.
CPC ......... *G09G 3/3618* (2013.01); *G09G 3/3614* (2013.01); *H04N 7/127* (2013.01); *H04N 21/440281* (2013.01); *G09G 2320/046* (2013.01); *G09G 2320/103* (2013.01); *G09G 2320/106* (2013.01); *G09G 2330/021* (2013.01); *G09G 2340/0435* (2013.01)

(58) Field of Classification Search
CPC ..... G09G 2340/0435; G09G 2320/106; G09G 2330/021; H04N 7/0127–7/0132; H04N 7/0135–7/0147; H04N 21/440281; H04N 5/144–5/145
See application file for complete search history.

(56) References Cited

U.S. PATENT DOCUMENTS

| 7,123,246 | B2 | 10/2006 | Nakatani et al. |
| 7,286,108 | B2 | 10/2007 | Tsuda et al. |
| 7,321,353 | B2 | 1/2008 | Tsuda et al. |
| 7,924,276 | B2 | 4/2011 | Tsuda et al. |
| 2003/0202780 | A1* | 10/2003 | Dumm et al. ........ 386/112 |

(Continued)

FOREIGN PATENT DOCUMENTS

| CN | 1529511 A | 9/2004 |
| CN | 1842838 A | 10/2006 |

(Continued)

OTHER PUBLICATIONS

Japanese Office Action for Application No. 2016-028309 dated Dec. 20, 2016.

(Continued)

*Primary Examiner* — Pegeman Karimi
(74) *Attorney, Agent, or Firm* — Lerner, David, Littenberg, Krumholz & Mentlik, LLP

(57) ABSTRACT

A display includes: a frame-rate conversion section being configured to be capable of changing a frame-rate conversion ratio having a value of 1 or more, the frame-rate conversion section converting a frame rate of an image signal at the frame-rate conversion ratio being set; and a display section displaying an image having undergone frame rate conversion.

18 Claims, 26 Drawing Sheets

(56) References Cited

U.S. PATENT DOCUMENTS

| | | | |
|---|---|---|---|
| 2004/0236807 A1* | 11/2004 | Hsiung et al. | 708/200 |
| 2005/0285815 A1* | 12/2005 | Tryhub et al. | 345/58 |
| 2006/0092321 A1 | 5/2006 | Ogino et al. | |
| 2007/0200838 A1* | 8/2007 | Lee et al. | 345/204 |
| 2007/0273787 A1* | 11/2007 | Ogino et al. | 348/441 |
| 2007/0296876 A1* | 12/2007 | Terada | H04N 5/44513 348/790 |
| 2008/0094344 A1 | 4/2008 | Kuroki | |
| 2008/0199156 A1 | 8/2008 | Uchiike et al. | |
| 2008/0231745 A1 | 9/2008 | Ogino et al. | |
| 2009/0196573 A1* | 8/2009 | Kurita | H04N 5/775 386/278 |
| 2009/0244330 A1 | 10/2009 | Sugisawa et al. | |
| 2010/0053429 A1* | 3/2010 | Miyazaki et al. | 348/513 |
| 2010/0091186 A1* | 4/2010 | Takata | 348/452 |
| 2010/0214473 A1 | 8/2010 | Kanai | |
| 2011/0032419 A1* | 2/2011 | Sakaniwa et al. | 348/452 |
| 2011/0227961 A1* | 9/2011 | Kikuta | 345/690 |
| 2012/0002106 A1* | 1/2012 | Mori | G09G 5/00 348/441 |
| 2014/0232935 A1 | 8/2014 | Mori et al. | |

FOREIGN PATENT DOCUMENTS

| | | |
|---|---|---|
| CN | 101496088 A | 7/2009 |
| CN | 101815197 A | 8/2010 |
| JP | 2001111968 A | 4/2001 |
| JP | 2001-312253 A | 11/2001 |
| JP | 2003-044011 A | 2/2003 |
| JP | 2006129181 A | 5/2006 |
| JP | 2008236098 A | 10/2008 |
| JP | 2008268436 A | 11/2008 |
| JP | 2010-056694 A | 3/2010 |
| JP | 2011002519 A | 1/2011 |

OTHER PUBLICATIONS

Chinese Office Action for Application No. 2012102505961 dated Dec. 21, 2016.

* cited by examiner

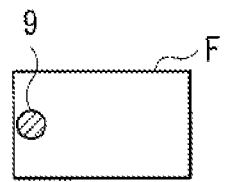
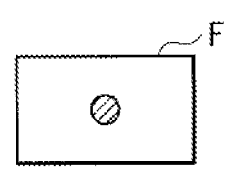
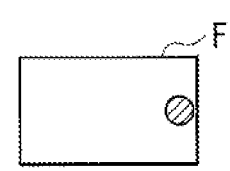
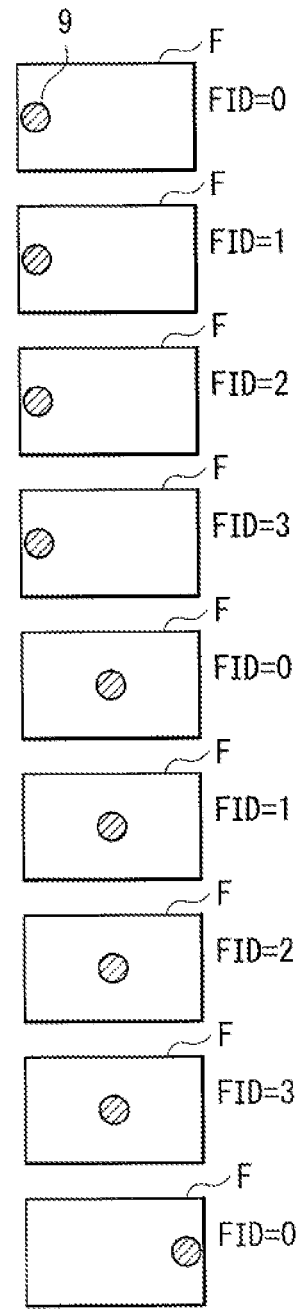
FIG. 14A    FIG. 14B

DISPLAY HAVING FIXED FRAME-RATE UP CONVERSION FOLLOWED BY VARIABLE FRAME-RATE DOWN CONVERSION, WHEREIN FRAME DECIMATION IS CARRIED OUT ACCORDING TO FRAME ID NUMBER

CROSS-REFERENCE TO RELATED APPLICATION

The present application claims priority from Japanese Patent Application No. JP 2011-158039 filed in the Japanese Patent Office on Jul. 19, 2011, the entire content of which is incorporated herein by reference.

BACKGROUND

The disclosure relates to a display having a function of performing frame rate conversion, and a display method used for such a display.

As one type of image signal processing intended to improve image quality in a display, there is frame rate conversion using frame interpolation. In the frame rate conversion, interpolation frames interpolating between adjacent frames of an inputted image are generated and added to the inputted image, as described in Japanese Unexamined Patent Application Publication No. 2010-56694, for example. This makes the displayed image smooth, and reduces a so-called motion blur caused by maintaining the state of pixels for one frame, in a liquid crystal display, for example. As a result, image quality thereof improves.

Incidentally, for electronic units, reduction of power consumption is desired in general, which is desired for displays as well, and various methods intended to attempt a reduction in power consumption have been suggested for the displays. One of such methods is intermittent driving. For example, Japanese Unexamined Patent Application Publication Nos. 2001-312253 and No. 2003-044011 each suggest a display, in which frame images included in supplied image signals conforming to a criteria standard are displayed after being thinned out.

SUMMARY

However, when a frame rate is increased by the frame rate conversion, the image quality improves, but the power consumption is likely to increase. Meanwhile, when the intermittent driving of the display is performed, the power consumption is reduced, but the image quality is likely to decline.

It is desirable to provide a display and a display method which are capable of reducing power consumption while suppressing a decline in image quality.

A display according to an embodiment of the technology includes: a frame-rate conversion section being configured to be capable of changing a frame-rate conversion ratio having a value of 1 or more, the frame-rate conversion section converting a frame rate of an image signal at the frame-rate conversion ratio being set; and a display section displaying an image having undergone frame rate conversion.

A display method according to an embodiment of the technology includes: setting a frame-rate conversion ratio having a value of 1 or more, and converting a frame rate of an image signal at the frame-rate conversion ratio; and displaying an image having undergone frame rate conversion.

In the display and the display method according to the embodiments of the technology, the image undergoes the frame rate conversion, and the image after the conversion is displayed on the display section. At this time, the frame rate conversion is performed at the frame-rate conversion ratio having a value of 1 or more.

According to the display and the display method in the embodiments of the technology, the frame rate conversion is changeable at the frame-rate conversion ratio having a value of 1 or more. Therefore, power consumption is reduced while a decline in image quality is suppressed.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 14A and 14B are schematic diagrams used to explain operation of the frame-rate conversion section according to still another modification of the first embodiment.

DETAILED DESCRIPTION

Embodiments of the technology will be described below in detail with reference to the drawings. It is to be noted that the description will be provided in the following order.

1. First embodiment
2. Second embodiment
3. Third embodiment (1. First Embodiment)
[Configuration Example]
(Overall Configuration Example)

Figure 1:
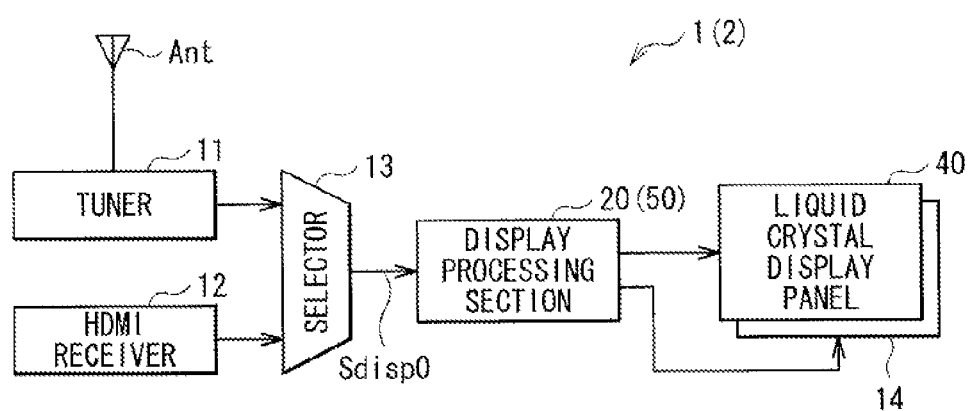
FIG. 1 is a block diagram illustrating a configuration example of a display according to first and second embodiments of the disclosure.

FIG. 1 illustrates a configuration example of a display according to a first embodiment. It is to be noted that a display method according to an embodiment of the disclosure is embodied by the present embodiment and thus will be described together.

A display 1 includes a tuner 11, and an HDMI (High-Definition Multimedia Interface) receiver 12, a selector 13, a display processing section 20, a backlight 14, and a liquid crystal display panel 40.

The tuner 11 selects a desired image signal (a stream) from a broadcast wave received by an antenna Ant. The HDMI receiver 12 is an interface that receives an image signal supplied from an external unit (not illustrated). The selector 13 selects one of the image signal supplied from the tuner 11 and the image signal supplied from the HDMI receiver 12, and outputs the selected one as an image signal Sdisp0. In this example, the image signal Sdisp0 is an image signal including a frame image F of 60 frames per second, and includes a picture signal Ssig0, a horizontal synchronizing signal Hsync0, and a vertical synchronizing signal Vsync0, as will be described later. It is to be noted that the configuration of the image signal Sdisp0 is not limited to this example. For instance, the image signal Sdisp0 may include, in addition to these signals, a signal such as a display enable signal that designates display or non-display in the liquid crystal display panel 40.

The display processing section 20 subjects the image signal Sdisp0 to processing including frame rate conversion, and controls the backlight 14 and the liquid crystal display panel 40 based on a result of the processing. The backlight 14 is configured using an LED (Light Emitting Diode), a CCFL (Cold Cathode Fluorescent Lamp), or the like, and emits surface-emitted light to the liquid crystal display panel 40. In this example, the backlight 14 performs so-called blinking operation in which lighting and extinction are repeated, as will be described later. The liquid crystal display panel 40 performs display by driving a liquid crystal display device and modulating the light emitted from the backlight 14. In this example, the liquid crystal display panel 40 is capable of performing quadruple-speed driving, and performs display by frame inversion.

(Display Processing Section 20)

Figure 2:
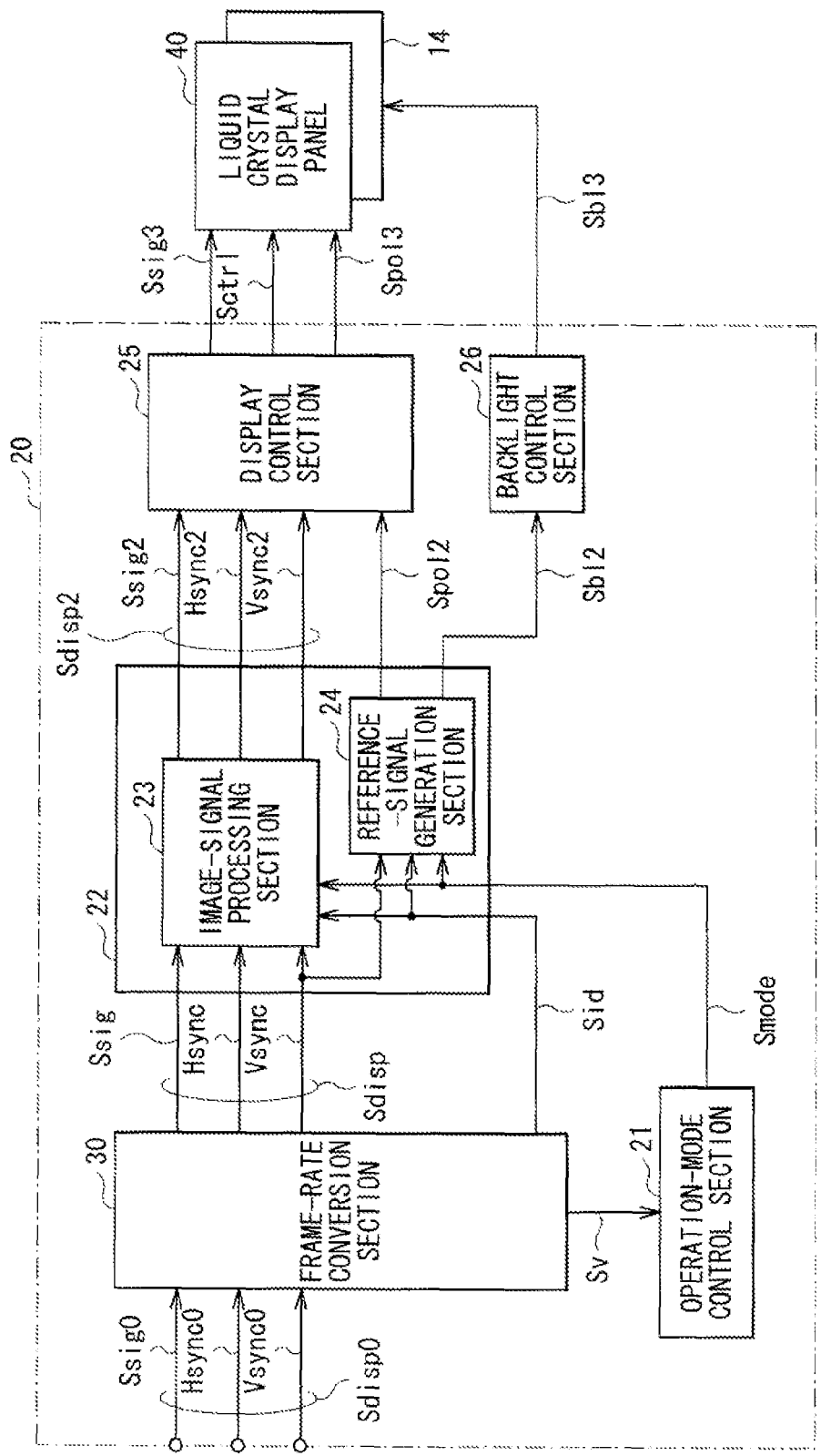
FIG. 2 is a block diagram illustrating a configuration example of a display processing section according to the first embodiment.

FIG. 2 illustrates a configuration example of the display processing section 20, together with the backlight 14 and the liquid crystal display panel 40. The display processing section 20 includes a frame-rate conversion section 30, an operation-mode control section 21, a signal processing section 22, a display control section 25, and a backlight control section 26.

The frame-rate conversion section 30 performs the frame rate conversion based on the supplied image signal Sdisp0 (the picture signal Ssig0, the horizontal synchronizing signal Hsync0, and the vertical synchronizing signal Vsync0), and thereby generates and outputs an image signal Sdisp (a picture signal Ssig, a horizontal synchronizing signal Hsync, and a vertical synchronizing signal Vsync). The frame-rate conversion section 30 also has a function of generating and outputting a motion vector signal Sv and a frame-identification signal Sid (both will be described later).

Figure 3A:
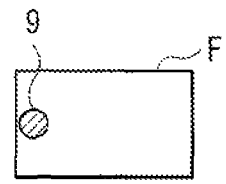
FIGS. 3A and 3B are schematic diagrams used to explain operation of a frame-rate conversion section illustrated in FIG. 2.
Figure 3A:
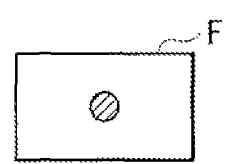
Figure 3A:
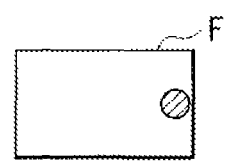
Figure 3B:
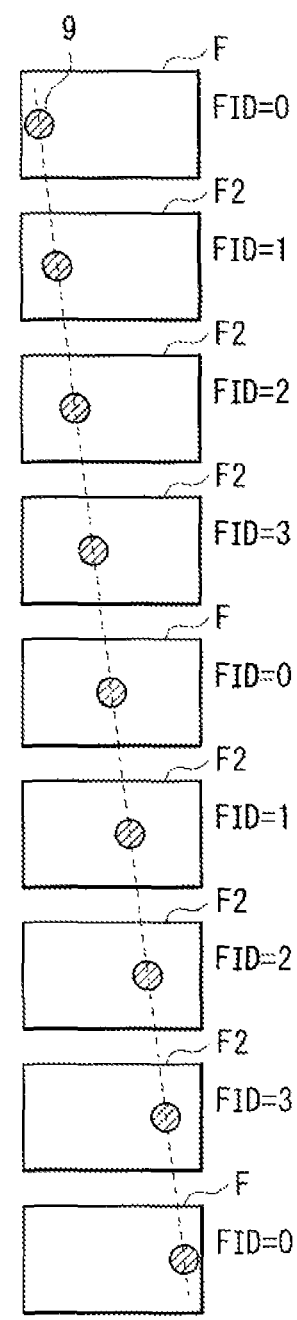

FIGS. 3A and 3B schematically illustrate the frame rate conversion in the frame-rate conversion section 30. Specifically, FIG. 3A illustrates an image before the frame rate conversion, and FIG. 3B illustrates an image after the frame rate conversion. In this example, the frame-rate conversion section 30 performs the frame rate conversion to thereby increase a frame rate by four times, from 60 frames per second to 240 frames per second. This frame rate conversion is performed by generating three interpolation frame images F2 based on image information on the frame images F temporally adjacent to each other, and inserting the interpolation frame images F2 between these frame images F. As a result, in an image in which a ball 9 moves from left to right in the frame images F as illustrated in FIG. 3A, for example, the three interpolation frame images F2 are inserted between the frame images F adjacent to each other as illustrated in FIG. 3B. Therefore, to a viewer, the ball 9 looks as if it is moving smoothly. In addition, insertion of these interpolation frame images F2 reduces a so-called motion blur resulting from the fact that the liquid crystal display panel 40 is of a hold type.

Figure 4:
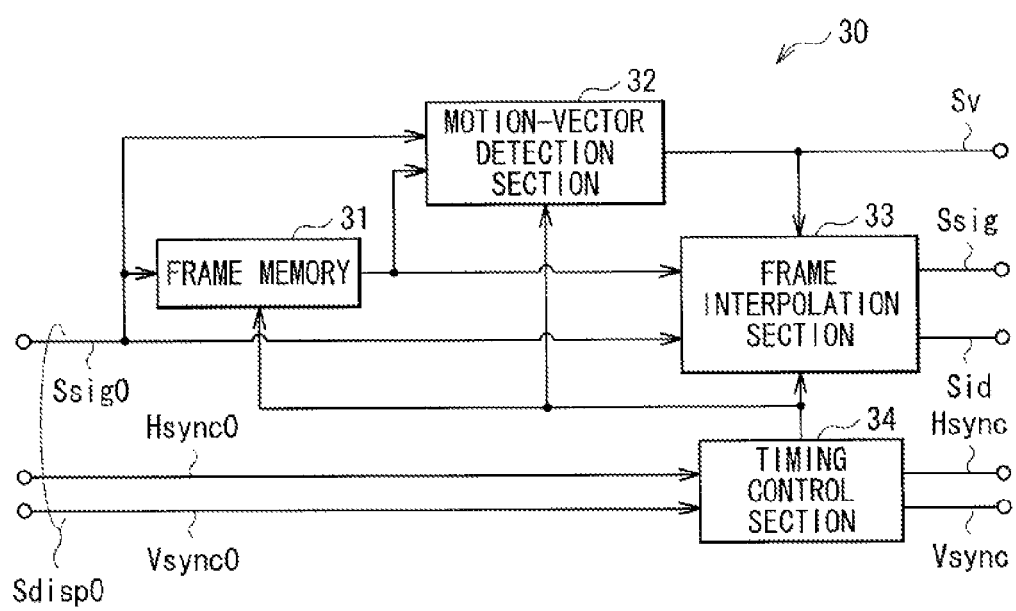
FIG. 4 is a block diagram illustrating a configuration example of the frame-rate conversion section illustrated in FIG. 2.

FIG. 4 illustrates a configuration example of the frame-rate conversion section 30. The frame-rate conversion section 30 includes a frame memory 31, a motion-vector detection section 32, a frame interpolation section 33, and a timing control section 34.

The frame memory 31 has a function of holding the frame image F for one frame included in the supplied picture signal Ssig0, thereby outputting the one-frame-old frame image F in the picture signal Ssig0.

The motion-vector detection section 32 detects a motion vector indicating a change in the image, based on the frame image F included in the picture signal Ssig0 and the one-frame-old frame image F supplied from the frame memory 31. Specifically, based on information on the two supplied frame images F, the motion-vector detection section 32 determines the motion vector, by detecting a motion in a horizontal direction and a motion in a vertical direction of a displayed content, for each block including a plurality of pixels, for example. The motion-vector detection section 32 then outputs a series of motion vectors determined for each block, as the motion vector signal Sv.

The frame interpolation section 33 generates the three interpolation frame images F2, by interpolating between the two frame images F temporally adjacent to each other, based on the motion vector signal Sv supplied from the motion-vector detection section 32. This frame interpolation section 33 then outputs the frame image F and the interpolation frame images F2, as the picture signal Ssig. The frame interpolation section 33 also has a function of assigning a frame identification number FID to each of the frame image F and the interpolation frame images F2, and outputting the frame identification number FID as the frame-identification signal Sid. Specifically, as illustrated in FIG. 3B, the frame interpolation section 33 assigns the frame identification number FID "0" to the frame image F, and assigns the frame identification numbers FID "1", "2", and "3" to the three subsequent interpolation frame images F2, respectively.

The timing control section 34 controls operation timing of each of the frame memory 31, the motion-vector detection section 32, and the frame interpolation section 33, based on the horizontal synchronizing signal Hsync0 and the vertical synchronizing signal Vsync0. In addition, the timing control section 34 has a function of generating and outputting the horizontal synchronizing signal Hsync and the vertical synchronizing signal Vsync corresponding to the picture signal Ssig after the frame rate conversion.

The operation-mode control section 21 outputs an operation-mode signal Smode, based on the motion vector signal Sv supplied from the frame-rate conversion section 30. Specifically, the operation-mode control section 21 determines a motion magnitude A for each of the frame images F, by integrating the magunitude of the motion vector, over the entire surface or a predetermined region of the frame image F. This motion vector has been determined per block, for example, and supplied by the motion vector signal Sv. The operation-mode control section 21 then determines operation modes M1 to M3 by comparing the motion magnitude A with predetermined thresholds TH1 and TH2, and outputs a result of the determination as the operation-mode signal Smode.

Figure 5:
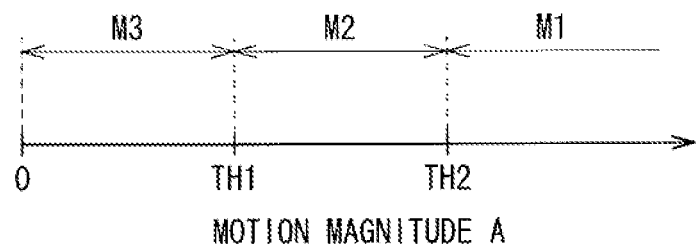
FIG. 5 is an explanatory diagram used to explain operation of an operation-mode control section illustrated in FIG. 2.

FIG. 5 illustrates a relationship between the motion magnitude A and the operation modes M1 to M3. When the motion magnitude A is equal to or greater than the threshold TH2, the operation-mode control section 21 generates the operation-mode signal Smode indicating the operation mode M1. When the motion magnitude A is equal to or greater than the threshold TH1 and less than the threshold TH2, the operation-mode control section 21 generates the operation-mode signal Smode indicating the operation mode M2.

When the motion magnitude A is less than the threshold TH1, the operation-mode control section 21 generates the operation-mode signal Smode indicating the operation mode M3.

As illustrated in FIG. 2, the signal processing section 22 generates and outputs an image signal Sdisp2, a polarity reference signal Spol2, and a backlight reference signal Sbl2, based on the image signal Sdisp and the frame-identification signal Sid supplied from the frame-rate conversion section 30, as well as the operation-mode signal Smode supplied from the operation-mode control section 21. The signal processing section 22 includes an image-signal processing section 23 and a reference-signal generation section 24.

The image-signal processing section 23 performs frame rate conversion at a variable frame-rate conversion ratio R, based on the image signal Sdisp, the operation-mode signal Smode, and the frame-identification signal Sid, and outputs a result of the frame rate conversion as the image signal Sdisp2. Specifically, as will be described later, the image-signal processing section 23 performs the frame rate conversion to lower a frame rate of the image signal Sdisp, at the frame-rate conversion ratio R corresponding to any of the operation modes M1 to M3 designated by the operation-mode signal Smode. The image-signal processing section 23 then outputs a result of the frame rate conversion as the image signal Sdisp2 (the picture signal Ssig2, the horizontal synchronizing signal Hsync2, and the vertical synchronizing signal Vsync2). In this example, the image-signal processing section 23 performs the frame rate conversion at the frame-rate conversion ratio R=1 in the operation mode M1, the frame rate conversion at the frame-rate conversion ratio R=1/2 in the operation mode M2, and the frame rate conversion at the frame-rate conversion ratio R=1/4 in the operation mode M3. At this time, the image-signal processing section 23 lowers the frame rate by performing thinning-out through masking of a signal portion related to the interpolation frame image F2 of the image signal Sdisp, based on the operation-mode signal Smode and the frame-identification signal Sid, as will be described later.

The reference-signal generation section 24 generates the polarity reference signal Spol2 and the backlight reference signal Sbl2 corresponding to the image signal Sdisp2 which has undergone the frame rate conversion, based on the vertical synchronizing signal Vsync, the operation-mode signal Smode, and the frame-identification signal Sid. The polarity reference signal Spol2 is a reference signal used to designate the timing of inversion driving in the liquid crystal display panel 40. The backlight reference signal Sbl2 is a reference signal used to designate the timing of the blinking operation in the backlight 14. Specifically, the reference-signal generation section 24 selects each of partial pulse portions of the vertical synchronizing signal Vsync based on the operation-mode signal Smode and the frame-identification signal Sid, and outputs the selected pulse portion as each of the polarity reference signal Spol2 and the backlight reference signal Sbl2, as will be described later.

The display control section 25 controls the liquid crystal display panel 40, based on the image signal Sdisp2 and the polarity reference signal Spol2. Specifically, the display control section 25 performs predetermined image processing such as gamma processing and overdrive processing based on the picture signal Ssig2, thereby generating and outputting a picture signal Ssig3. In addition, the display control section 25 generates a liquid-crystal-display-panel control signal Sctrl based on the horizontal synchronizing signal Hsync2 as well as the vertical synchronizing signal Vsync2, and also generates a polarity signal Spol3 based on the polarity reference signal Spol2.

The backlight control section 26 controls the backlight 14, based on the backlight reference signal Sbl2. Specifically, the backlight control section 26 generates a backlight control signal Sb13, based on the backlight reference signal Sbl2.
(Liquid Crystal Display Panel 40)

Figure 6:
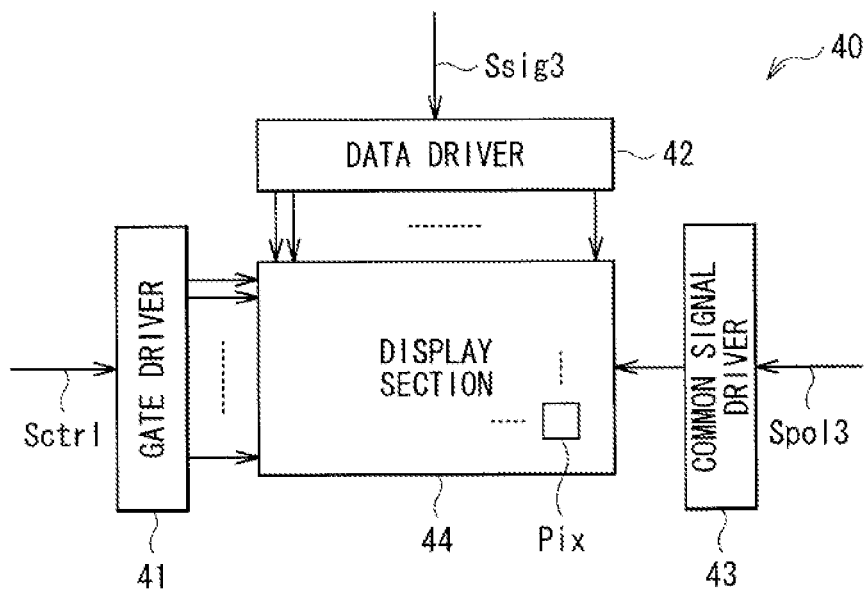
FIG. 6 is a block diagram illustrating a configuration example of a liquid crystal display panel illustrated in FIG. 1.

FIG. 6 illustrates an example of a block diagram of the liquid crystal display panel 40. The liquid crystal display panel 40 includes a gate driver 41, a data driver 42, a common signal driver 43, and a display section 44. The gate driver 41 performs line sequential scanning, by sequentially selecting pixels Pix in the display section 44 row by row, based on the liquid-crystal-display-panel control signal Sctr1. The data driver 42 supplies a pixel signal to each of the pixels Pix of the display section 44, based on the picture signal Ssig3. The common signal driver 43 supplies a common signal to a common electrode COM (which will be described later) of the display section 44, based on the polarity signal Spol3. In the display section 44, the pixels Pix each configured using the liquid crystal display device are arranged in a matrix.

Figure 7A:
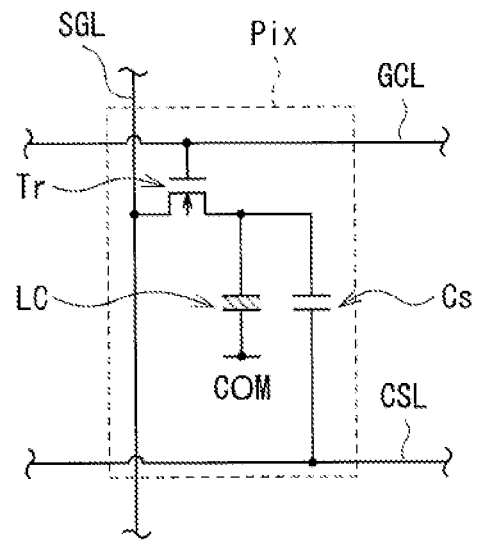
FIGS. 7A and 7B are explanatory diagrams each illustrating a configuration example of the liquid crystal display panel illustrated in FIG. 1.
Figure 7B:
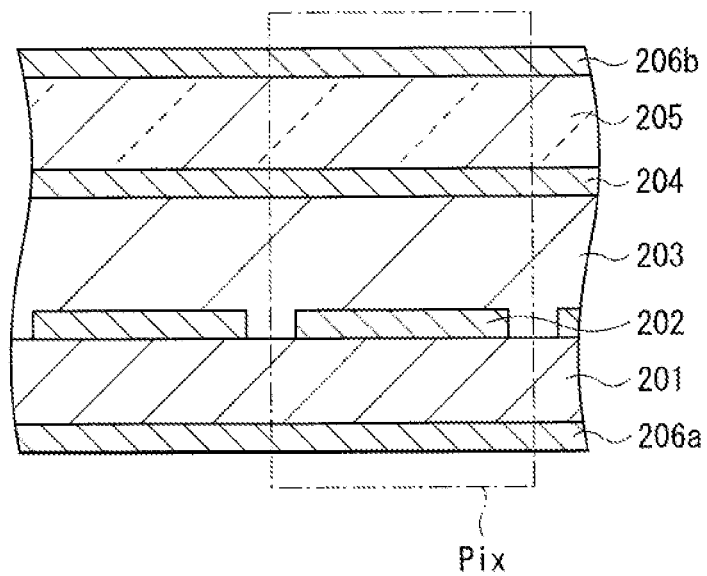

FIGS. 7A and 7B each illustrate a configuration example of the display section 44. FIG. 7A illustrates an example of a circuit diagram of the pixel Pix in the display section 44, and FIG. 7B illustrates a cross-sectional configuration of the display section 44.

As illustrated in FIG. 7A, the pixel Pix includes a TFT (Thin Film Transistor) device Tr, a liquid crystal device LC, and a retention capacitive device Cs. The TFT device Tr is configured using, for example, a MOS-FET (Metal Oxide Semiconductor-Field Effect Transistor). Of the TFT device Tr, a gate is connected to a gate line GCL, a source is connected to a data line SGL, and a drain is connected to one end of the liquid crystal element LC as well as one end of the retention capacitive device Cs. Of the liquid crystal device LC, one end is connected to the drain of the TFT device Tr, and the other end is connected to the common electrode COM. Of the retention capacitive device Cs, one end is connected to the drain of the TFT device Tr, and the other end is connected to a retention capacitive line CSL. The gate line GCL is connected to the gate driver 41, and the data line SGL is connected to the data driver 42. Further, the common electrode COM is connected to the common signal driver 43.

The display section 44 is a section in which a liquid crystal layer 203 is sealed between a drive substrate 201 and a counter substrate 205, as illustrated in FIG. 7B. In the drive substrate 201, a pixel drive circuit (not illustrated) including the TFT device Tr is formed. On the drive substrate 201, a pixel electrode 202 is disposed for each of the pixels Pix. In the counter substrate 205, color filters (not illustrated) corresponding to red (R), green (G), and blue (B) are formed. On a surface on the liquid crystal layer 203 side of the counter substrate 205, a counter electrode 204 is disposed as an electrode (the common electrode COM) common to the pixels Pix. Of the drive substrate 201, opposite to a surface where the pixel electrodes 202 are formed is a surface to which a polarizing plate 206a is affixed. Of the counter substrate 205, opposite to the surface where the counter electrode 204 is formed is a surface to which a polarizing plate 206b is attached. These polarizing plates 206a and 206b are adhered to each other to be in a crossed Nichol state, for example.

Here, the frame-rate conversion section 30 and the signal processing section 22 correspond to a specific but not limitative example of "frame-rate conversion section" in one embodiment of the technology. The frame-rate conversion section 30 corresponds to a specific but not limitative example of "first conversion section" in one embodiment of the technology. The signal processing section 22 corresponds to a specific but not limitative example of "second conversion section" in one embodiment of the technology. The liquid crystal display panel 40 corresponds to a specific but not limitative example of "display section" in one embodiment of the technology. The frame image F corresponds to a specific but not limitative example of "original frame image" in one embodiment of the technology. The reference-signal generation section 24 corresponds to a specific but not limitative example of "inversion-signal generation section" in one embodiment of the technology. The operation-mode control section 21 corresponds to a specific but not limitative example of "conversion-ratio setting section" in one embodiment of the technology.
[Operation and Function]

Next, operation and function of the display 1 according to the present embodiment will be described.
(Summary of Overall Operation)

First, a summary of overall operation of the display 1 will be described with reference to FIGS. 1 and 2.

The tuner 11 selects the desired image signal (the stream) from the broadcast wave received by the antenna Ant. The HDMI receiver 12 receives the image signal supplied from the external unit (not illustrated). The selector 13 selects one of the image signal supplied from the tuner 11 and the image signal supplied from the HDMI receiver 12, and outputs the selected one as the image signal Sdisp0.

In the display processing section 20, the frame-rate conversion section 30 performs the frame rate conversion to increase the frame rate of the image signal Sdisp0 by four times, thereby generating the image signal Sdisp. The frame-rate conversion section 30 also generates the motion vector signal Sv and the frame-identification signal Sid. The operation-mode control section 21 generates the operation-mode signal Smode, based on the motion vector signal Sv. The image-signal processing section 23 of the signal processing section 22 subjects the image signal Sdisp to the frame rate conversion, at the frame-rate conversion ratio R corresponding to the operation-mode signal Smode, and thereby generates the image signal Sdisp2. The reference-signal generation section 24 of the signal processing section 22 generates the polarity reference signal Spol2 and the backlight reference signal Sbl2, based on the vertical synchronizing signal Vsync, the frame-identification signal Sid and the operation-mode signal Smode. The display control section 25 controls the liquid crystal display panel 40, based on the image signal Sdisp2 and the polarity reference signal Spol2. The backlight control section 26 controls the backlight 14, based on the backlight reference signal Sbl2. The backlight 14 emits the surface-emitted light to the liquid crystal display panel 40. The liquid crystal display panel 40 performs the display by modulating the light emitted from the backlight 14.
(Detailed Operation)

Next, detailed operation of the display 1 will be described. In the display 1, the motion-vector detection section 32 of the frame-rate conversion section 30 generates the motion vector signal Sv, based on the supplied image signal Sdisp0. Based on this motion vector signal Sv, the operation-mode control section 21 determines the motion magnitude A, and thereby decides any of the operation modes M1 to M3. Operation of the operation-mode control section 21 will be described below.

Figure 8:
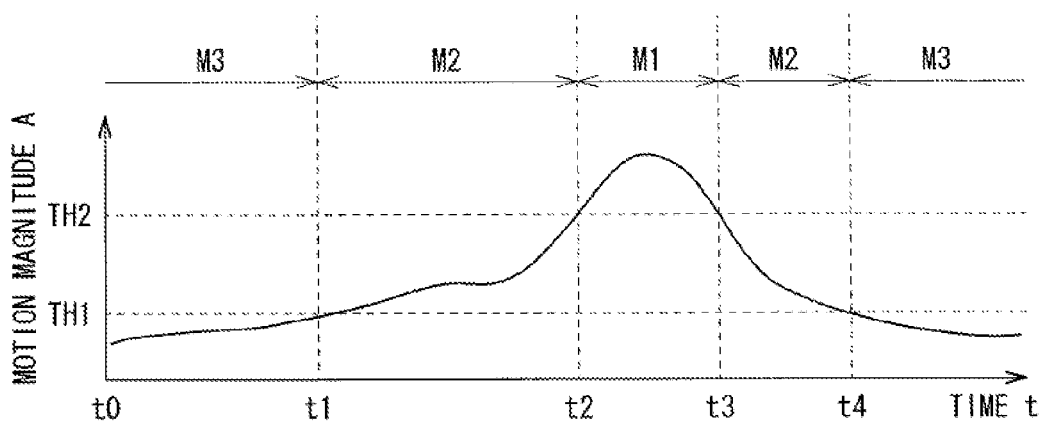
FIG. 8 is a timing waveform diagram used to explain the operation of the operation-mode control section illustrated in FIG. 2.

FIG. 8 illustrates a waveform chart of the motion magnitude A. In this example, the motion magnitude A changes with time, over a wide range. First, in a period from timing t0 to timing t1, the value of the motion magnitude A is lower than the threshold TH1. In this case, the operation-mode control section 21 determines that the display 1 is to operate in the operation mode M3. Next, in a period from the timing t1 to timing t2, when the value of the motion magnitude A becomes equal to or higher than the threshold TH1 and lower than the threshold TH2, the operation-mode control section 21 determines that the display 1 is to operate in the operation mode M2. Subsequently, in a period from the timing t2 to timing t3, when the value of the motion magnitude A becomes equal to or higher than the threshold TH2, the operation-mode control section 21 determines that the display 1 is to operate in the operation mode M1. In the display 1, the operation mode thus dynamically varies in response to changes in the image information.

In the display 1, the signal processing section 22 changes the frame-rate conversion ratio R according to the operation modes M1 to M3 determined by the operation-mode control section 21, and thereby a refresh rate of the display in the liquid crystal display panel 40 varies. Specifically, the frame-rate conversion ratio R in the signal processing section 22 is 1 in the operation mode M1, 1/2 in the operation mode M2, and 1/4 in the operation mode M3. In other words, in the display 1, the frame-rate conversion ratio R increases (e.g., the frame-rate conversion ratio R=1) when the motion magnitude A is large (when a change in the frame image F is large), and the frame-rate conversion ratio R decreases (e.g., the frame-rate conversion ratio R=1/4) when the motion magnitude A is small (when a change in the frame image F is small). This allows the display 1 to enhance the image quality by increasing the refresh rate of the display when the motion magnitude A is large, and reduce the power consumption while minimizing the decline in the image quality by decreasing the refresh rate of the display when the motion magnitude A is small. Specifically, the power consumption of each of the gate driver 41, the data driver 42, and the common signal driver 43 in the liquid crystal display panel 40 in particular is reduced by decreasing the refresh rate of the display.

Now, detailed operation of the display processing section 20 in each of the operation modes M1 to M3 will be described below sequentially. First, the detailed operation of the display processing section 20 in the operation mode M1 will be described.

Figure 9:
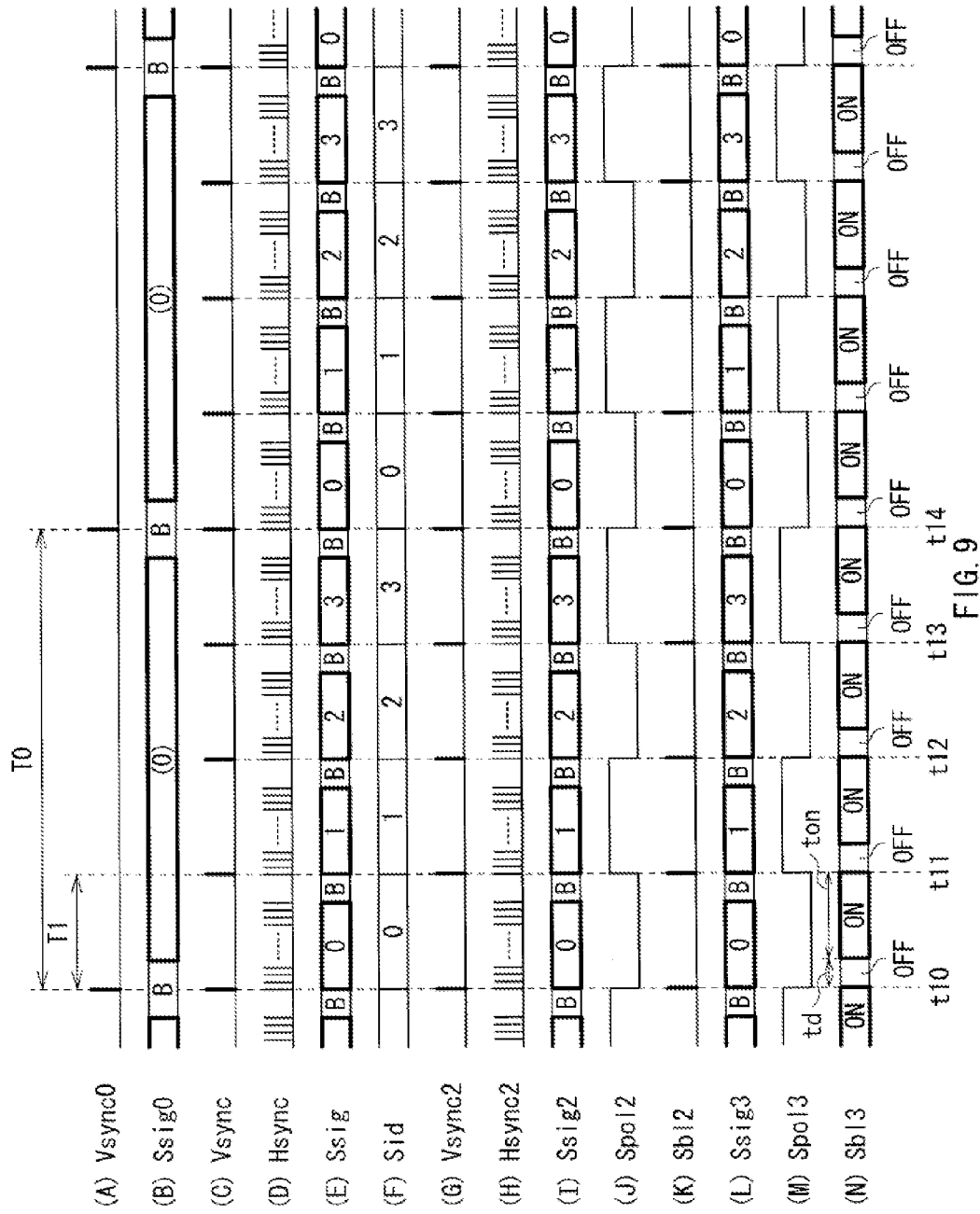
FIG. 9 is a diagram illustrating a timing chart of an operation example of the display processing section illustrated in FIG. 2.

FIG. 9 illustrates a timing chart of the display processing section 20 in the operation mode M1. Parts (A) and (B) of FIG. 9 illustrate the vertical synchronizing signal Vsync0 and the picture signal Ssig0 of the image signal Sdisp0, respectively. Parts (C) to (E) of FIG. 9 illustrate the vertical synchronizing signal Vsync, the horizontal synchronizing signal Hsync, and the picture signal Ssig of the image signal Sdisp, respectively. Part (F) of FIG. 9 illustrates the frame-identification signal Sid. Parts (G) to (I) of FIG. 9 illustrate the vertical synchronizing signal Vsync2, the horizontal synchronizing signal Hsync2, and the picture signal Ssig2 of the image signal Sdisp2, respectively. Part (J) of FIG. 9 illustrates the polarity reference signal Spol2, and Part (K) of FIG. 9 illustrates the backlight reference signal Sbl2. Part (L) of FIG. 9 illustrates the picture signal Ssig3, Part (M) of FIG. 9 illustrates the polarity signal Spol3, and Part (N) of FIG. 9 illustrates the backlight control signal Sbl3. Here, in Parts (B), (E), (F), (I), and (L) of FIG. 9, numbers of "0" to "3" each indicate the frame identification number FID.

Further, in Parts (B), (E), (I), and (L) of FIG. 9, "B" indicates the signal corresponding to a perpendicular blanking period.

As illustrated in FIG. 9, the display processing section 20 is supplied with the frame image F by the image signal Sdisp0 (the vertical synchronizing signal Vsync0, the picture signal Ssig0 (Parts (A) and (B) of FIG. 9, and the like), in a cycle T0=16.7 [msec] (=1/60 [Hz]). It is to be noted that to this frame image F, the frame identification number FID=0 is assigned, as will be described below. The frame-rate conversion section 30 performs the frame rate conversion to increase the frame rate of this image signal Sdisp0 by four times, thereby generating the image signal Sdisp. Subsequently, without subjecting the image signal Sdisp to the frame rate conversion, the signal processing section 22 outputs the image signal Sdisp as the image signal Sdisp2, based on the operation-mode signal Smode indicating the operation mode M1. The details will be described below.

The frame-rate conversion section 30 performs the frame rate conversion to increase the frame rate by four times based on the image signal Sdisp0, thereby generating and outputting the image signal Sdisp (the vertical synchronizing signal Vsync, the horizontal synchronizing signal Hsync, and the picture signal Ssig) (Parts (C) to (E) of FIG. 9). Specifically, the frame-rate conversion section 30 outputs the image signal related to the frame image F, during a period from timing t10 to timing t11. The frame-rate conversion section 30 also outputs the image signals related to the three generated interpolation frame images F2 during a period from the timing t11 to timing t12, a period from the timing t12 to timing t13, and a period from the timing t13 to timing t14, respectively. In other words, the frame-rate conversion section 30 outputs each of the frame image F and the interpolation frame images F2 as the picture signal Ssig, in a cycle T1=4.2 [msec] (=1/60/4 [Hz]). Further, the frame interpolation section 33 of the frame-rate conversion section 30 assigns the frame identification number FID to each of the frame image F and the interpolation frame images F2 of the picture signal Ssig, and outputs the frame-identification signal Sid (Part (F) of FIG. 9). At this time, the frame interpolation section 33 assigns the frame identification number FID "0" to the frame image F, and the frame identification numbers FID "1", "2", and "3" to the subsequent three interpolation frame images F2, respectively.

The image-signal processing section 23 of the signal processing section 22 sets the frame-rate conversion ratio R at 1, based on the operation-mode signal Smode indicating the operation mode M1, and outputs the image signal Sdisp directly as the image signal Sdisp2 (Parts (G) to (I) of FIG. 9). Further, based on the operation-mode signal Smode indicating the operation mode M1, the reference-signal generation section 24 of the signal processing section 22 generates and outputs the polarity reference signal Spol2 (Part (J) of FIG. 9) that inverts in synchronization with the pulse of the supplied vertical synchronizing signal Vsync. The reference-signal generation section 24 outputs this vertical synchronizing signal Vsync as the backlight reference signal Sbl2 (Part (K) of FIG. 9).

The display control section 25 generates and outputs the picture signal Ssig3 (Part (L) of FIG. 9) based on the picture signal Ssig2 of the image signal Sdisp2, and also generates and outputs the polarity signal Spol3 (Part (M) of FIG. 9) based on the polarity reference signal Spol2. Further, the backlight control section 26 generates and outputs the backlight control signal Sbl3 (Part (N) of FIG. 9), based on the backlight reference signal Sbl2. The backlight control signal Sbl3 is used to light (ON) or extinguish (OFF) the backlight 14. At this time, the backlight control section 26 generates the backlight control signal Sb13, which changes the backlight 14 from lighting to extinction after a lapse of predetermined time "td" following the pulse of the backlight reference signal Sbl2, and changes the backlight 14 from extinction to lighting after a lapse of predetermined time "ton" thereafter.

In this way, in the operation mode M1, the image with the large motion magnitude A is displayed on the liquid crystal display panel 40 at the high refresh rate and therefore, the image quality is enhanced.

Next, the detailed operation of the display processing section 20 in the operation mode M2 will be described.

Figure 10:
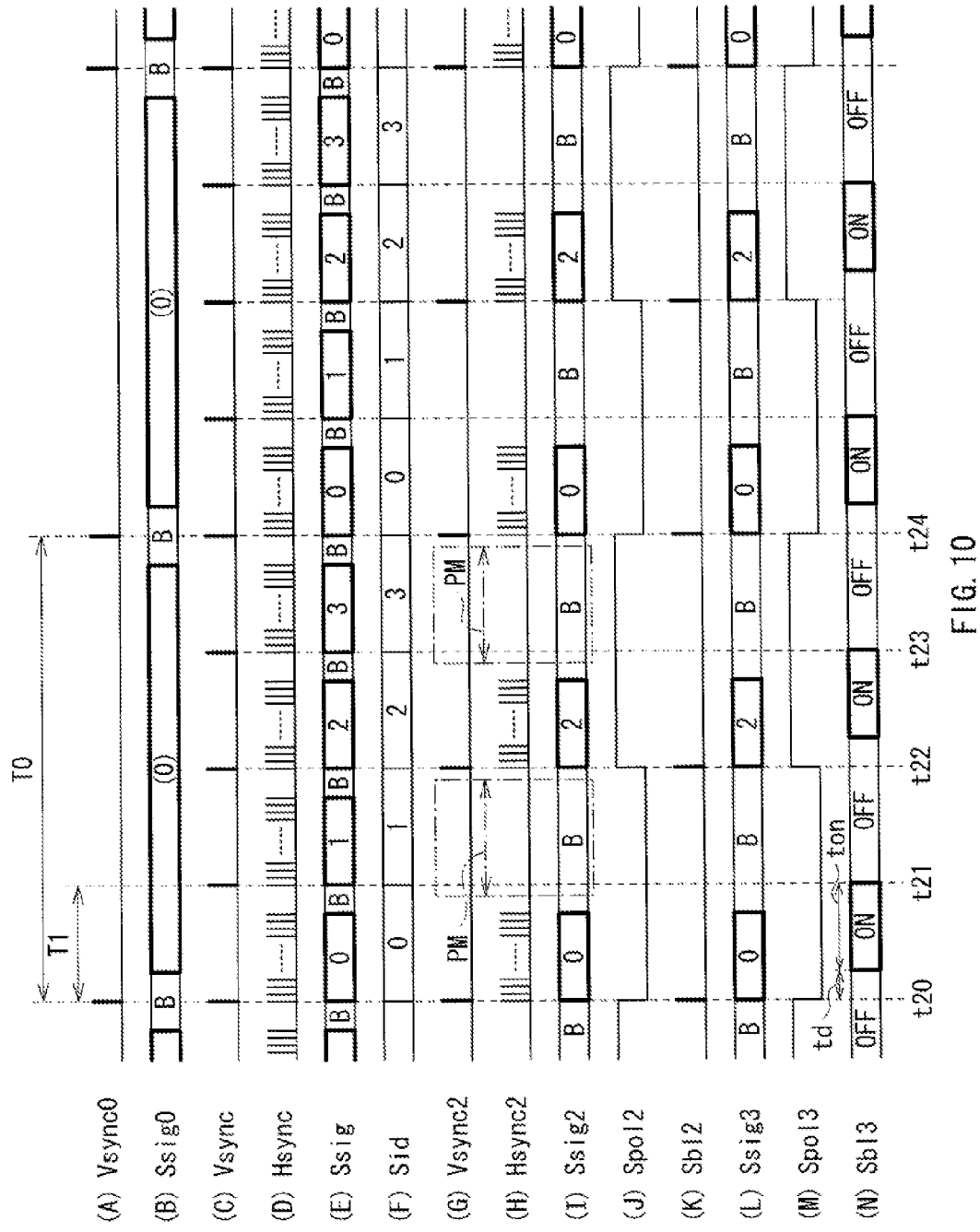
FIG. 10 is a diagram illustrating a timing chart of another operation example of the display processing section illustrated in FIG. 2.

FIG. 10 illustrates a timing chart of the display processing section 20 in the operation mode M2. Parts (A) and (B) of FIG. 10 illustrate the vertical synchronizing signal Vsync0 and the picture signal Ssig0 of the image signal Sdisp0, respectively. Parts (C) to (E) of FIG. 10 illustrate the vertical synchronizing signal Vsync, the horizontal synchronizing signal Hsync, and the picture signal Ssig of the image signal Sdisp, respectively. Part (F) of FIG. 10 illustrates the frame-identification signal Sid. Parts (G) to (I) of FIG. 10 illustrate the vertical synchronizing signal Vsync2, the horizontal synchronizing signal Hsync2, and the picture signal Ssig2 of the image signal Sdisp2, respectively. Part (J) of FIG. 10 illustrates the polarity reference signal Spol2, and Part (K) of FIG. 10 illustrates the backlight reference signal Sbl2. Part (L) of FIG. 10 illustrates the picture signal Ssig3, Part (M) of FIG. 10 illustrates the polarity signal Spol3, and Part (N) of FIG. 10 illustrates the backlight control signal Sbl3.

In the operation mode M2, the signal processing section 22 subjects the image signal Sdisp to the frame rate conversion at the frame-rate conversion ratio R of 1/2, based on the operation-mode signal Smode indicating the operation mode M2, and outputs a result of the frame rate conversion as the image signal Sdisp2. In other words, in the operation mode M2, the operation of the frame-rate conversion section 30 is similar to that in the operation mode M1, while the operation of the signal processing section 22 and circuits in subsequent stages is different from that in the operation mode M1. The details will be described below.

The image-signal processing section 23 of the signal processing section 22 sets the frame-rate conversion ratio R at 1/2, based on the operation-mode signal Smode indicating the operation mode M2. Specifically, the image-signal processing section 23 masks signal portions corresponding to a period (a mask period PM) in which the frame identification number FID of the frame-identification signal Sid (Part (F) of FIG. 10) is "1" or "3", of the vertical synchronizing signal Vsync, the horizontal synchronizing signal Hsync, and the picture signal Ssig related to the image signal Sdisp (Parts (C) to (E) of FIG. 10). Meanwhile, the image-signal processing section 23 directly outputs signal portions corresponding to a period in which the frame identification number FID is "0" or "2", as the vertical synchronizing signal Vsync2, the horizontal synchronizing signal Hsync2, and the picture signal Ssig2 (Parts (G) to (I) of FIG. 10). In other words, the image-signal processing section 23 outputs the frame image F and the interpolation frame image F2 as the picture signal Ssig2, in a cycle of T0/2 (=8.3 [msec]=1/60/2 [Hz]). At this time, the image-signal processing section 23 outputs the picture signal Ssig2 of the frame image F, in a quarter of the cycle T0 (i.e. during a period from timing t20 to timing t21), and outputs the picture signal Ssig2 of the interpolation frame image F2 in another quarter of the cycle T0 (i.e. during a period from timing t22 to timing t23).

Further, based on the operation-mode signal Smode indicating the operation mode M2, the reference-signal generation section 24 of the signal processing section 22 selects the pulse corresponding to the period in which the frame identification number FID of the frame-identification signal Sid (Part (F) of FIG. 10) is "0" or "2", from the pulses of the supplied vertical synchronizing signal Vsync (Part (C) of FIG. 10). The reference-signal generation section 24 then generates and outputs the polarity reference signal Spol2 that inverts in synchronization with this pulse. Furthermore, based on the operation-mode signal Smode indicating the operation mode M2, the reference-signal generation section 24 masks a signal portion of the supplied vertical synchronizing signal Vsync (Part (C) of FIG. 10), the portion corresponding to the period in which the frame identification number FID of the frame-identification signal Sid (Part (F) of FIG. 10) is "1" "0 or "3". Meanwhile, the reference-signal generation section 24 directly outputs a signal portion of the supplied vertical synchronizing signal Vsync (Part (C) of FIG. 10) as the backlight reference signal Sbl2 (Part (K) of FIG. 10), the portion corresponding to the period in which the frame identification number FID is "0" or "2".

The display control section 25 generates and outputs the picture signal Ssig3 (Part (L) of FIG. 10) based on the picture signal Ssig2 of the image signal Sdisp2, and also generates and outputs the polarity signal Spol3 (Part (M) of FIG. 10) based on the polarity reference signal Spol2. The backlight control section 26 generates and outputs the backlight control signal Sbl3 (Part (N) of FIG. 10) based on the backlight reference signal Sbl2, in a manner similar to the operation mode M1. In other words, the backlight control section 26 generates the backlight control signal Sbl3, which changes the backlight 14 from extinction to lighting after a lapse of predetermined time "td" following the pulse of the backlight reference signal Sbl2, and changes the backlight 14 from lighting to extinction after a lapse of predetermined time "ton" thereafter.

In this way, in the operation mode M2, the image with the moderate motion magnitude A is displayed on the liquid crystal display panel 40 at the refresh rate slightly lower than that in the operation mode M1. Thereby, the power consumption is reduced, while a decline in the image quality is suppressed.

The detailed operation of the display processing section 20 in the operation mode M3 will be described next.

Figure 11:
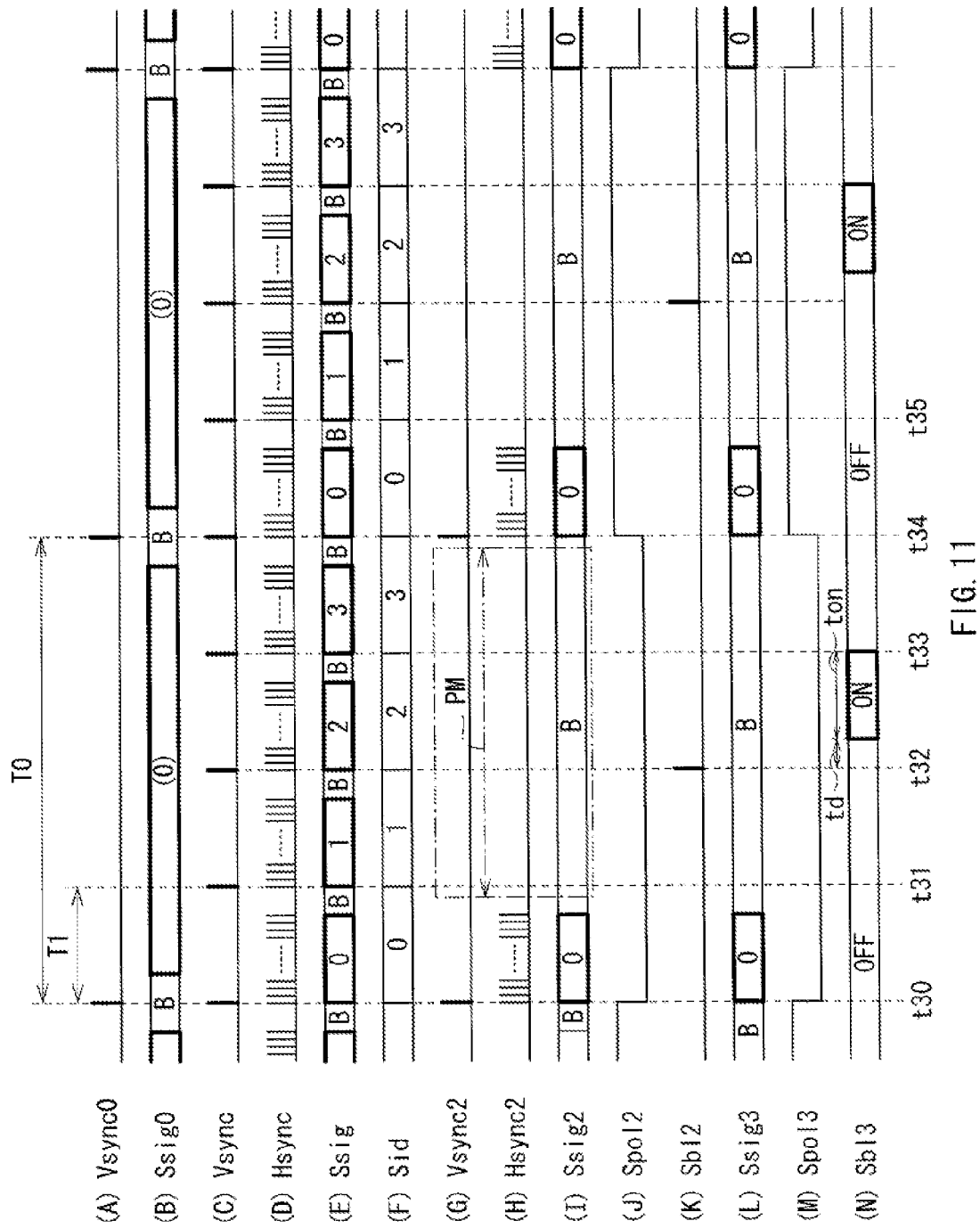
FIG. 11 is a diagram illustrating a timing chart of still another operation example of the display processing section illustrated in FIG. 2.

FIG. 11 illustrates a timing chart of the display processing section 20 in the operation mode M3. Parts (A) and (B) of FIG. 11 illustrate the vertical synchronizing signal Vsync0 and the picture signal Ssig0 of the image signal Sdisp0, respectively. Parts (C) to (E) of FIG. 11 illustrate the vertical synchronizing signal Vsync, the horizontal synchronizing signal Hsync, and the picture signal Ssig of the image signal Sdisp, respectively. Part (F) of FIG. 11 illustrates the frame-identification signal Sid. Parts (G) to (I) of FIG. 11 illustrate the vertical synchronizing signal Vsync2, the horizontal synchronizing signal Hsync2, and the picture signal Ssig2 of the image signal Sdisp2, respectively. Part (J) of FIG. 11 illustrates the polarity reference signal Spol2, and Part (K) of FIG. 11 illustrates the backlight reference signal Sbl2. Part (L) of FIG. 11 illustrates the picture signal Ssig3, Part (M) of FIG. 11 illustrates the polarity signal Spol3, and Part (N) of FIG. 11 illustrates the backlight control signal Sbl3.

In the operation mode M3, the signal processing section 22 subjects the image signal Sdisp to the frame rate conversion at the frame-rate conversion ratio R of 1/4, based on the operation-mode signal Smode indicating the operation mode M3, and outputs a result of the frame rate conversion as the image signal Sdisp2. In other words, in the operation mode M3, the operation of the frame-rate conversion section 30 is similar to those in the operation modes M1 and M2, while the operation of the signal processing section 22 and the circuits in the subsequent stages is different from those in the operation modes M1 and M2. The details will be described below.

The image-signal processing section 23 of the signal processing section 22 sets the frame-rate conversion ratio R at 1/4, based on the operation-mode signal Smode indicating the operation mode M3. Specifically, the image-signal processing section 23 masks signal portions corresponding to a period (a mask period PM) in which the frame identification numbers FID of the frame-identification signal Sid (Part (F) of FIG. 11) are "1" to "3", of the vertical synchronizing signal Vsync, the horizontal synchronizing signal Hsync, and the picture signal Ssig of the image signal Sdisp (Parts (C) to (E) of FIG. 11). Meanwhile, the image-signal processing section 23 directly outputs signal portions corresponding to a period in which the frame identification number FID is "0", as the vertical synchronizing signal Vsync2, the horizontal synchronizing signal Hsync2, and the picture signal Ssig2 (Parts (G) to (I) of FIG. 11). In other words, the image-signal processing section 23 outputs the frame image F as the picture signal Ssig2, in the cycle of T0=16.7 [msec] (=1/60 [Hz]). At this time, the image-signal processing section 23 outputs the picture signal Ssig2 of the frame image F, in a quarter of the cycle T0(i.e. during a period from timing t30 to timing t31).

Further, based on the operation-mode signal Smode indicating the operation mode M3, the reference-signal generation section 24 of the signal processing section 22 selects the pulse corresponding to the period in which the frame identification number FID of the frame-identification signal Sid (Part (F) of FIG. 11) is "0", from the pulses of the supplied vertical synchronizing signal Vsync (Part (C) of FIG. 11). The reference-signal generation section 24 then generates and outputs the polarity reference signal Spol2 that inverts in synchronization with this pulse. Furthermore, based on the operation-mode signal Smode indicating the operation mode M3, the reference-signal generation section 24 masks a signal portion of the supplied vertical synchronizing signal Vsync (Part (C) of FIG. 11), the portion corresponding to the period in which the frame identification numbers FID of the frame-identification signal Sid (Part (F) of FIG. 11) are "0", "1", and "3". Meanwhile, the reference-signal generation section 24 directly outputs a signal portion of the supplied vertical synchronizing signal Vsync (Part (C) of FIG. 11) as the backlight reference signal Sbl2 (Part (K) of FIG. 11), the portion corresponding to the period in which the frame identification number FID is "2".

The display control section 25 generates and outputs the picture signal Ssig3 (Part (L) of FIG. 11) based on the picture signal Ssig2 of the image signal Sdisp2, and also generates and outputs the polarity signal Spol3 (Part (M) of FIG. 11) based on the polarity reference signal Spol2. Further, in a manner similar to the operation modes M1 and M2, the backlight control section 26 generates and outputs the backlight control signal Sbl3 (Part (N) of FIG. 11), based on the backlight reference signal Sbl2.

In this way, in the operation mode M3, the image with the low motion magnitude A is displayed on the liquid crystal display panel 40 at the low refresh rate. Thereby, the power consumption is reduced, while a decline in the image quality is suppressed.

In the display 1, after the frame-rate conversion section 30 performs the conversion of increasing the frame rate by predetermined times (four times), the image-signal processing section 23 performs the frame rate conversion by selectively masking a part of the image signal Sdisp (the picture signal Ssig, the horizontal synchronizing signal Hsync, and the vertical synchronizing signal Vsync) according to an instruction indicating any of the operation modes M1 to M3 from the operation-mode control section 21. This realizes a mechanism of making the frame-rate conversion ratio variable, with a simple configuration.

Further, in the display 1, the image-signal processing section 23 leaves the signal portion in which the frame identification number FID is "0", when masking the part of the image signal Sdisp (the picture signal Ssig, the horizontal synchronizing signal Hsync, and the vertical synchronizing signal Vsync). Specifically, for instance, as illustrated in Parts (G) to (I) of FIG. 11, the image-signal processing section 23 masks the signal portions in which the frame identification numbers FID are "1" to "3", and outputs the signal portion in which the frame identification number FID is "0", of the image signal Sdisp. Here, as described above, the image with the frame identification number FID being "0" corresponds to the frame image F, and the images with the frame identification numbers FID being "1" to "3" correspond to the interpolation frame images F2. In this way, in the display 1, the image-signal processing section 23 masks the signal portions in which the frame identification numbers FID are "1" to "3" (the interpolation frame image F2), while outputting the signal portion in which the frame identification number FID is "0" (the frame image F), when masking the image signal Sdisp. Thus, for instance, even when an error occurs in the interpolation frame image F2 generated by the frame interpolation section 33 of the frame-rate conversion section 30, a decline in the image quality is suppressed. When, for example, the image-signal processing section 23 masks signal portions in which the frame identification numbers FID are "0", "2", and "3", and outputs a signal portion in which the frame identification number FID is "1" (the interpolation frame image F2), of the image signal Sdisp in the operation mode M3, there is a possibility that an image with an error will be displayed. In contrast, in the display 1 according to the present embodiment, the signal portion in which the frame identification number FID is "0" (the frame image F) is outputted. Therefore, even when an error occurs in the interpolation frame image F2 generated by the frame interpolation section 33, the image with the error is masked not to be displayed on the liquid crystal display panel 40 and thus, a decline in the image quality is suppressed.

Furthermore, in the display 1, the reference-signal generation section 24 generates the polarity reference signal Spol2, based on the frame-identification signal Sid and the operation-mode signal Smode. In other words, the reference-signal generation section 24 generates the polarity reference signal Spol2 corresponding to the frame-rate conversion ratio R in the image-signal processing section 23. This allows the display 1 to perform normal inversion driving. When the reference-signal generation section 24 generates the polarity reference signal by performing inversion operation in synchronization with all the pulses of the vertical synchronizing signal Vsync in the operation mode M3 (FIG. 11), for example, a waveform of the polarity reference signal Spol2 (Part (J) of FIG. 11) becomes a waveform similar to that in Part (J) of FIG. 9, and a waveform of the polarity signal Spol3 (Part (M) of FIG. 11) becomes a waveform similar to that in Part (M) of FIG. 9. In this case, the polarity signal Spol3 typically stays at a low level during the period in which the picture signal Ssig3 (Part (L) of FIG. 11) is written in the display panel 40 (e.g., the period from the timing t30 to the timing t31, and a period from timing t34 to timing t35), and it is difficult to perform the normal inversion driving. In the display 1 however, the reference-signal generation section 24 generates the polarity reference signal Spol2 corresponding to the frame-rate conversion ratio R in the image-signal processing section 23. Therefore, as illustrated in FIG. 11, the polarity signal Spol3 inverts every time the picture signal Ssig3 (Part (L) of FIG. 11) is written in the display panel 40, allowing the normal inversion driving to be performed. Thus, in the display 1, a phenomenon of a so-called "burn-in" in the liquid crystal display panel 40 is reduced.

[Effects]

In the present embodiment, the frame-rate conversion ratio in the image signal processing section is changed based on the motion magnitude in the image signal as described above. Therefore, the power consumption is reduced while a decline in the image quality is suppressed.

Moreover, in the present embodiment, the image-signal processing section performs the frame rate conversion by selectively masking a part of the supplied image signal, after the frame rate is converted by the frame-rate conversion section to be increased by the predetermined times. Therefore, a mechanism of making the frame-rate conversion ratio variable with a simple configuration is realized.

Further, in the present embodiment, the image-signal processing section masks the interpolation frame images among the frame image and the interpolation frame images, when masking the part of the supplied image signal. Therefore, a decline in the image quality is suppressed.

Furthermore, in the present embodiment, the reference-signal generation section generates the polarity reference signal corresponding to the frame-rate conversion ratio R in the image-signal processing section. Therefore, burn-in in the liquid crystal display panel is reduced.

[Modification 1-1]

Figure 12:
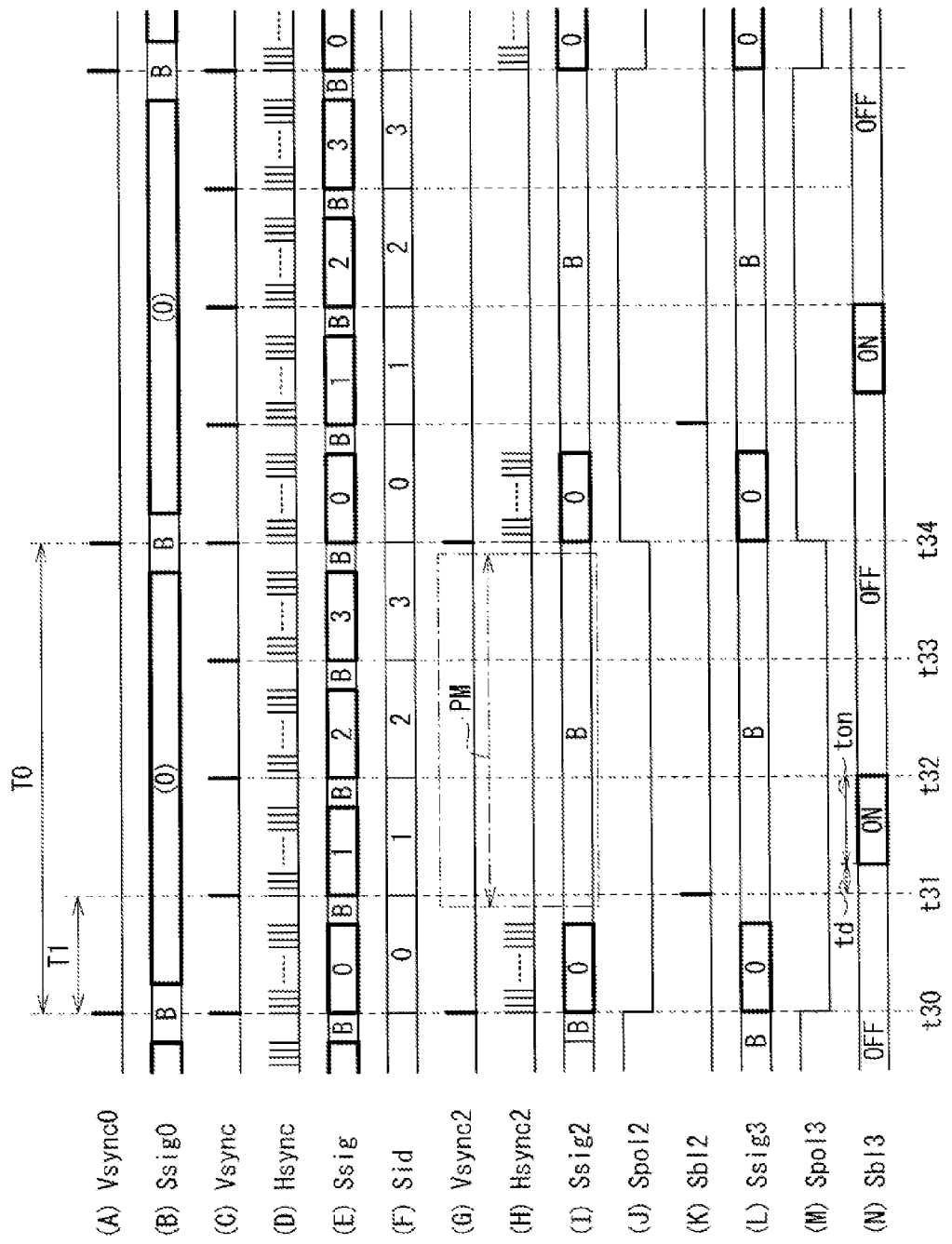
FIG. 12 is a diagram illustrating a timing chart of an operation example of the display processing section according to a modification of the first embodiment.

In the embodiment described above, the reference-signal generation section 24 outputs the signal portion of the vertical synchronizing signal Vsync as the backlight reference signal Sbl2, the portion corresponding to the period in which the frame identification number FID is "0" or "2", in the operation mode M2 (FIG. 10). The reference-signal generation section 24 also outputs the signal portion of the vertical synchronizing signal Vsync as the backlight reference signal Sbl2, the portion corresponding to the period in which the frame identification number FID "2", in the operation mode M3 (FIG. 11). However, the reference-signal generation section 24 is not limited to this case, and may output other signal portion of the vertical synchronizing signal Vsync. FIG. 12 illustrates an example in which the reference-signal generation section 24 outputs a signal portion of the vertical synchronizing signal Vsync as the backlight reference signal Sbl2, the portion corresponding to the period in which the frame identification number FID is "1", in the operation mode M3. In this case, the backlight 14 is lighted at the timing earlier than that in the case of FIG. 11. In this way, in the display 1, the timing of lighting the backlight 14 is freely set, in consideration of, for example, the response time of the liquid crystal device LC.

[Modification 1-2]

Figure 13:
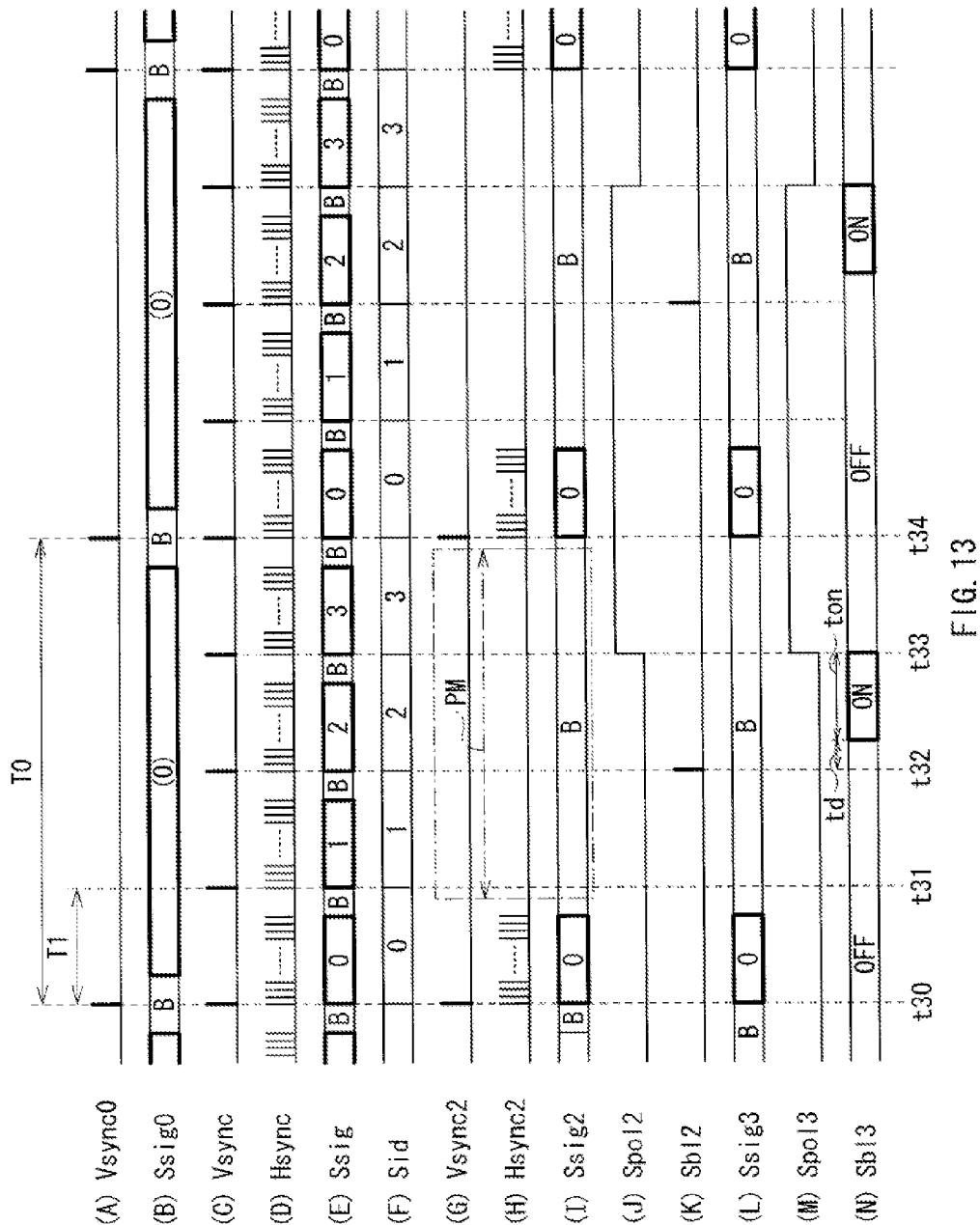
FIG. 13 is a diagram illustrating a timing chart of an operation example of the display processing section according to another modification of the first embodiment.

In the embodiment described above, the polarity reference signal Spol2 inverts based on the pulse of the vertical synchronizing signal Vsync corresponding to the period in which the frame identification number FID is "0" or "2" in the operation mode M2 (FIG. 10). Meanwhile, in the operation mode M3 (FIG. 11), the polarity reference signal Spol2 inverts based on the pulse of the vertical synchronizing signal Vsync corresponding to the period in which the frame identification number FID is "2". However, without being limited to this case, the polarity reference signal Spol2 may be inverted based on other pulse. FIG. 13 illustrates an example in which the polarity reference signal Spol2 inverts based on the pulse of the vertical synchronizing signal Vsync corresponding to the period in which the frame identification number FID is "3", in the operation mode M3.

[Modification 1-3]

In the embodiment described above, the frame-rate conversion section 30 performs the frame rate conversion by generating the interpolation frame images F2, although it is not limited thereto. Instead, the frame rate conversion may be performed by repeating the supplied frame image F, as illustrated in FIGS. 14A and 14B, for example. This method is used, for instance, in a game use in which displayed contents change at a high speed. In other words, when the interpolation frame images F2 are not generated, delay time after the image signal being supplied to the display 1 and before actual display is reduced. Therefore, a controller of a game console is operated timely in such a game use. In this case, the image signal Sdisp which has undergone the frame rate conversion is subjected to the processing as illustrated in FIG. 9 to FIG. 11, by the signal processing section 22. Thus, effects similar to those in the embodiment are obtained in this case as well.

[Other Modifications]

In the embodiment described above, the liquid crystal display panel 40 is capable of performing the quadruple-speed driving, although it is not limited thereto. Instead, the liquid crystal display panel 40 may be capable of performing double-speed driving, or driving at a speed higher than the quadruple speed. For example, when the liquid crystal display panel performing the double-speed driving is used, the frame-rate conversion section performs the conversion to double the frame rate, and the image-signal processing section 23 chooses 1 or 1/2 as the frame-rate conversion ratio R.

Moreover, in the embodiment described above, the backlight 14 performs the blinking operation, although it is not limited thereto. Instead, for example, the backlight 14 may be kept lighted.

(2.) Second Embodiment

Next, a display 2 according to a second embodiment will be described. The present embodiment is different from the first embodiment, in terms of frame rate conversion method. In the first embodiment (FIG. 2), the image-signal processing section 23 reduces the frame rate based on the variable frame-rate conversion ratio R, after the frame rate is converted by the frame-rate conversion section 30 to be increased by the predetermined times. In the present embodiment, the image-signal processing section 23 is removed, and a frame-rate conversion section increases a frame rate by using a variable frame-rate conversion ratio R2, instead. It is to be noted that elements substantially the same as those of the display 1 according to the first embodiment will be provided with the same characters as those of the display 1, and the description will be omitted as appropriate.

Figure 15:
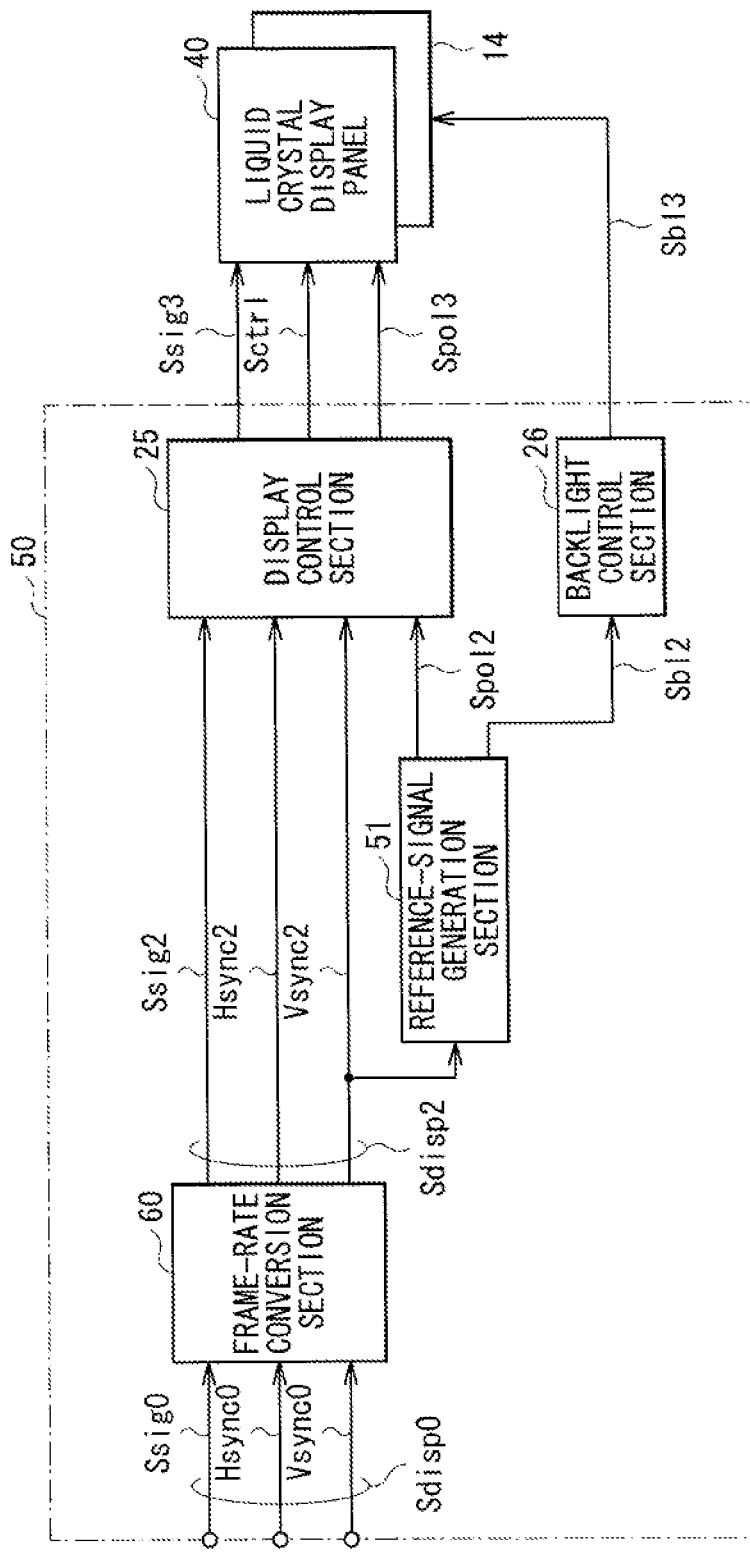
FIG. 15 is a block diagram illustrating a configuration example of a display processing section according to the second embodiment.

FIG. 15 illustrates a configuration example of a display processing section 50 according to the present embodiment. The display processing section 50 includes a frame-rate conversion section 60 and a reference-signal generation section 51. Here, the frame-rate conversion section 60 corresponds to a specific but not limitative example of "frame-rate conversion section" in one embodiment of the technology.

The frame-rate conversion section 60 performs frame rate conversion to increase the frame rate, by using the variable frame-rate conversion ratio R2 appropriate to a motion vector of a supplied image signal Sdisp0.

Figure 16:
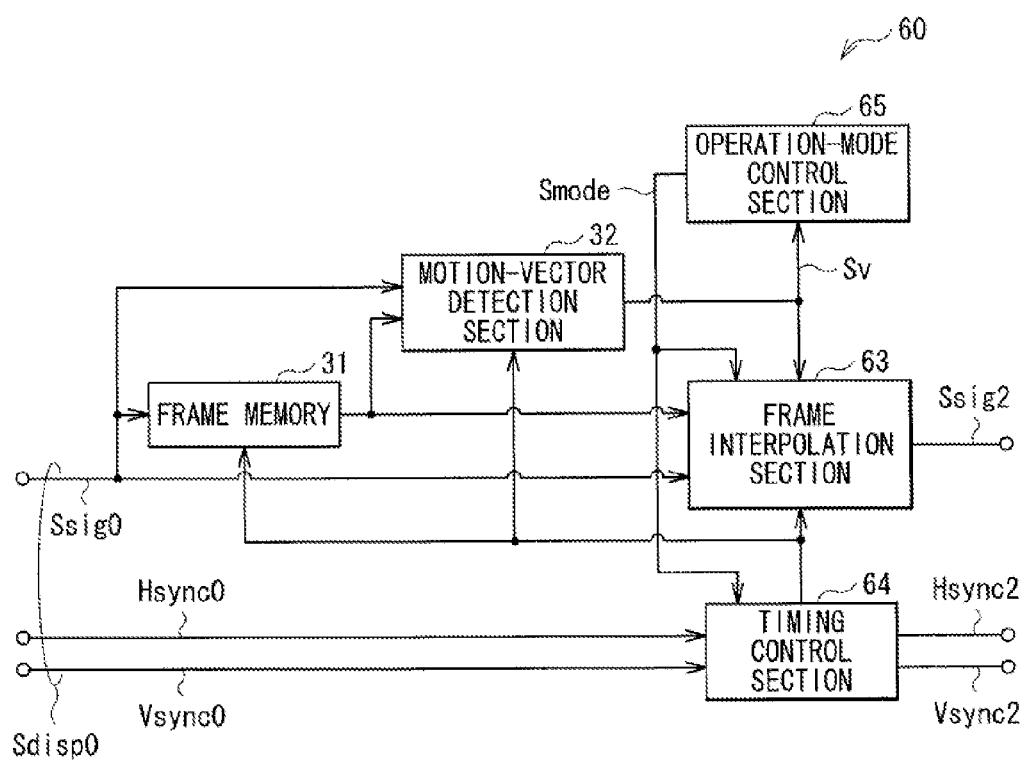
FIG. 16 is a block diagram illustrating a configuration example of a frame-rate conversion section illustrated in FIG. 15.

FIG. 16 illustrates a configuration example of the frame-rate conversion section 60. The frame-rate conversion section 60 includes an operation-mode control section 65, a frame interpolation section 63, and a timing control section 64.

The operation-mode control section 65 generates and outputs an operation-mode signal Smode based on a motion vector signal Sv supplied from a motion-vector detection section 32, in a manner similar to the operation-mode control section 21 according to the first embodiment.

The frame interpolation section 63 generates interpolation frame images F2, by interpolating between two frame images F temporally adjacent to each other, based on the motion vector signal Sv supplied from the motion-vector detection section 32, in a manner similar to the frame interpolation section 33 according to the first embodiment. Here, the frame interpolation section 63 controls the generation of the interpolation frame images F2 based on the operation-mode signal Smode, unlike the frame interpolation section 33. Specifically, the frame interpolation section 63 generates three interpolation frame images F2 in the operation mode M1, the one interpolation frame image F2 in the operation mode M2, and no interpolation frame image F2 in the operation mode M3. The frame interpolation section 63 then outputs the frame image F and the interpolation frame images F2, as a picture signal Ssig2.

The timing control section 64 controls operation timing of each of a frame memory 31, the motion-vector detection section 32, and the frame interpolation section 63, based on a horizontal synchronizing signal Hsync0, a vertical synchronizing signal Vsync0, and the motion vector signal Sv. The timing control section 64 also generates and outputs a horizontal synchronizing signal Hsync2 and a vertical synchronizing signal Vsync2 corresponding to the picture signal Ssig2 after the frame rate conversion.

In this way, the frame-rate conversion section 60 performs the frame rate conversion at the frame-rate conversion ratio R2=4 in the operation mode M1, and the frame rate conversion at the frame-rate conversion ratio R2=2 in the operation mode M2. In the operation mode M3 however, the frame-rate conversion section 60 operates not to perform the frame rate conversion (the frame-rate conversion ratio R2=1).

Based on the vertical synchronizing signal Vsync2, the reference-signal generation section 51 generates a polarity reference signal Spol2 and a backlight reference signal Sbl2 corresponding to an image signal Sdisp2 after the frame rate conversion.

Next, detailed operation of the display processing section 50 in each of the operation modes M1 to M3 will be described.

Figure 17:
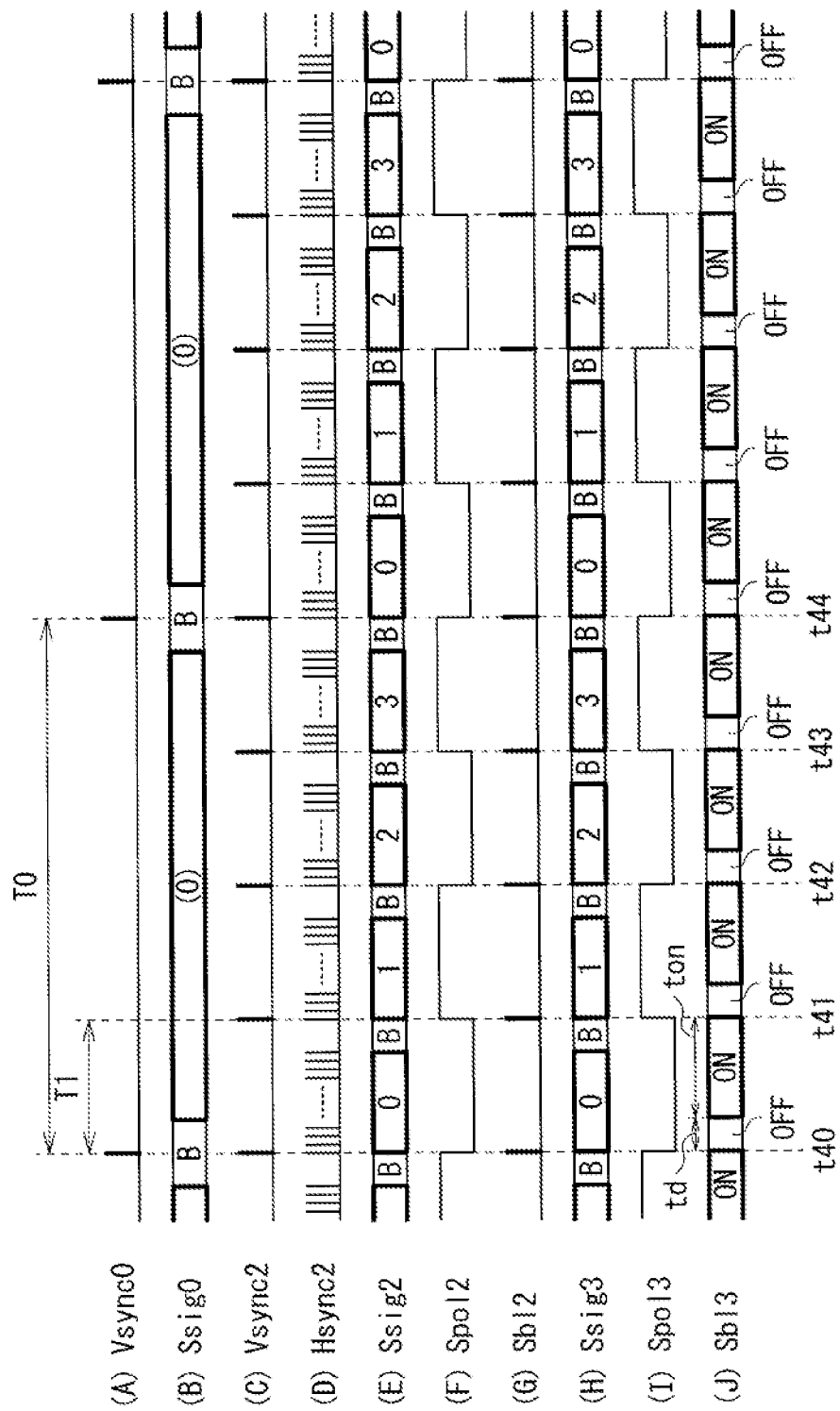
FIG. 17 is a diagram illustrating a timing chart of an operation example of the display processing section illustrated in FIG. 15.

FIG. 17 illustrates a timing chart of the display processing section 50 in the operation mode M1. Parts (A) and (B) of FIG. 17 illustrate the vertical synchronizing signal Vsync0 and a picture signal Ssig0 of the image signal Sdisp0, respectively. Parts (C) to (E) of FIG. 17 illustrate the vertical synchronizing signal Vsync2, the horizontal synchronizing signal Hsync2, and the picture signal Ssig2 of the image signal Sdisp2, respectively. Part (F) of FIG. 17 illustrates the polarity reference signal Spol2, and Part (G) of FIG. 17 illustrates the backlight reference signal Sbl2. Part (H) of FIG. 17 illustrates a picture signal Ssig3, Part (I) of FIG. 17 illustrates a polarity signal Spol3, and Part (J) of FIG. 17 illustrates a backlight control signal Sbl3. Here, in Parts (B), (E), and (H) of FIG. 17, each of numbers "0" to "3" is a frame identification number FID introduced for convenience of description. Like the first embodiment, the frame identification number FID="0" corresponds to the frame image F, and the frame identification numbers FID="1", "2", and "3" correspond to three interpolation frame images F2.

The frame-rate conversion section 60 sets the frame-rate conversion ratio R2 at 4, based on the operation-mode signal Smode indicating the operation mode M1. The frame-rate conversion section 60 then performs the frame rate conversion to increase the image signal Sdisp by four times, and outputs a result of the frame rate conversion as the image signal Sdisp2 (Parts (C) to (E) of FIG. 17). In other words, the frame-rate conversion section 60 outputs the frame image F and the interpolation frame images F2 as the picture signal Ssig2, in a cycle T1=4.2 [msec] (=1/60/4 [Hz]).

The reference-signal generation section 51 generates the polarity reference signal Spol2 (Part (F) of FIG. 17) that inverts in synchronization with the pulse of the supplied vertical synchronizing signal Vsync2. The reference-signal generation section 51 then outputs this vertical synchronizing signal Vsync2 as the backlight reference signal Sbl2 (Part (G) of FIG. 17).

In a manner similar to the first embodiment, a display control section 25 generates and outputs the picture signal Ssig3 (Part (H) of FIG. 17) based on the picture signal Ssig2 of the image signal Sdisp2, and also generates and outputs the polarity signal Spol3 (Part (I) of FIG. 17) based on the polarity reference signal Spol2. A backlight control section 26 generates and outputs the backlight control signal Sbl3 (Part (J) of FIG. 17) based on the backlight reference signal Sbl2, in a manner similar to the first embodiment.

Figure 18:
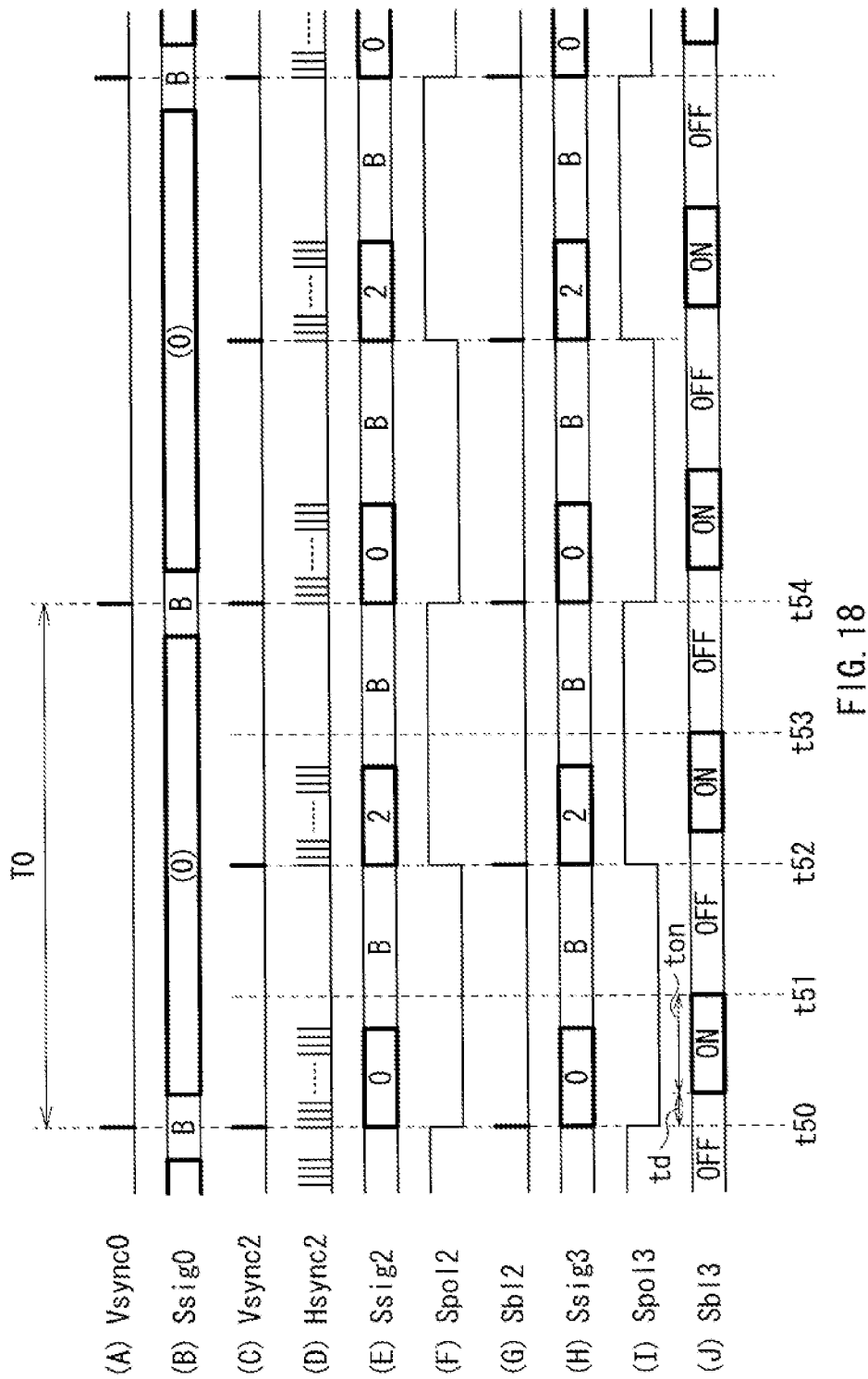
FIG. 18 is a diagram illustrating a timing chart of still another operation example of the display processing section illustrated in FIG. 15.

FIG. 18 illustrates a timing chart of the display processing section 50 in the operation mode M2. Parts (A) and (B) of FIG. 18 illustrate the vertical synchronizing signal Vsync0 and the picture signal Ssig0 of the image signal Sdisp0, respectively. Parts (C) to (E) of FIG. 18 illustrate the vertical synchronizing signal Vsync2, the horizontal synchronizing signal Hsync2, and the picture signal Ssig2 of the image signal Sdisp2, respectively. Part (F) of FIG. 18 illustrates the polarity reference signal Spol2, and Part (G) of FIG. 18 illustrates the backlight reference signal Sbl2. Part (H) of FIG. 18 illustrates the picture signal Ssig3, Part (I) of FIG. 18 illustrates the polarity signal Spol3, and Part (J) of FIG. 18 illustrates the backlight control signal Sbl3.

The frame-rate conversion section 60 sets the frame-rate conversion ratio R2 at 2, based on the operation-mode signal Smode indicating the operation mode M2. The frame-rate conversion section 60 then performs the frame rate conversion to double the image signal Sdisp, and outputs a result of the frame rate conversion as the image signal Sdisp2 (Parts (C) to (E) of FIG. 18). In other words, the frame-rate conversion section 60 outputs the frame image F and the interpolation frame images F2 as the picture signal Ssig2, in a cycle T0/2 (=8.3 [msec]=1/60/2 [Hz]). At this time, the frame-rate conversion section 60 outputs the picture signal Ssig2 of the frame image F, in a quarter of the cycle T0 (a period from timing t50 to timing t51), and outputs the picture signal Ssig2 of the interpolation frame image F2 in another quarter of the cycle T0 (a period from timing t52 to timing t53).

The reference-signal generation section 51 generates and outputs the polarity reference signal Spol2 (Part (F) of FIG. 18) that inverts in synchronization with the pulse of the supplied vertical synchronizing signal Vsync2, and outputs this vertical synchronizing signal Vsync2 as the backlight reference signal Sbl2 (Part (G) of FIG. 18).

In a manner similar to the first embodiment, the display control section 25 generates and outputs the picture signal Ssig3 (Part (H) of FIG. 18) based on the picture signal Ssig2 of the image signal Sdisp2, and also generates and outputs the polarity signal Spol3 (Part (I) of FIG. 18) based on the polarity reference signal Spol2. The backlight control section 26 generates and outputs the backlight control signal Sbl3 (Part (J) of FIG. 18) based on the backlight reference signal Sbl2, in a manner similar to the first embodiment.

Figure 19:
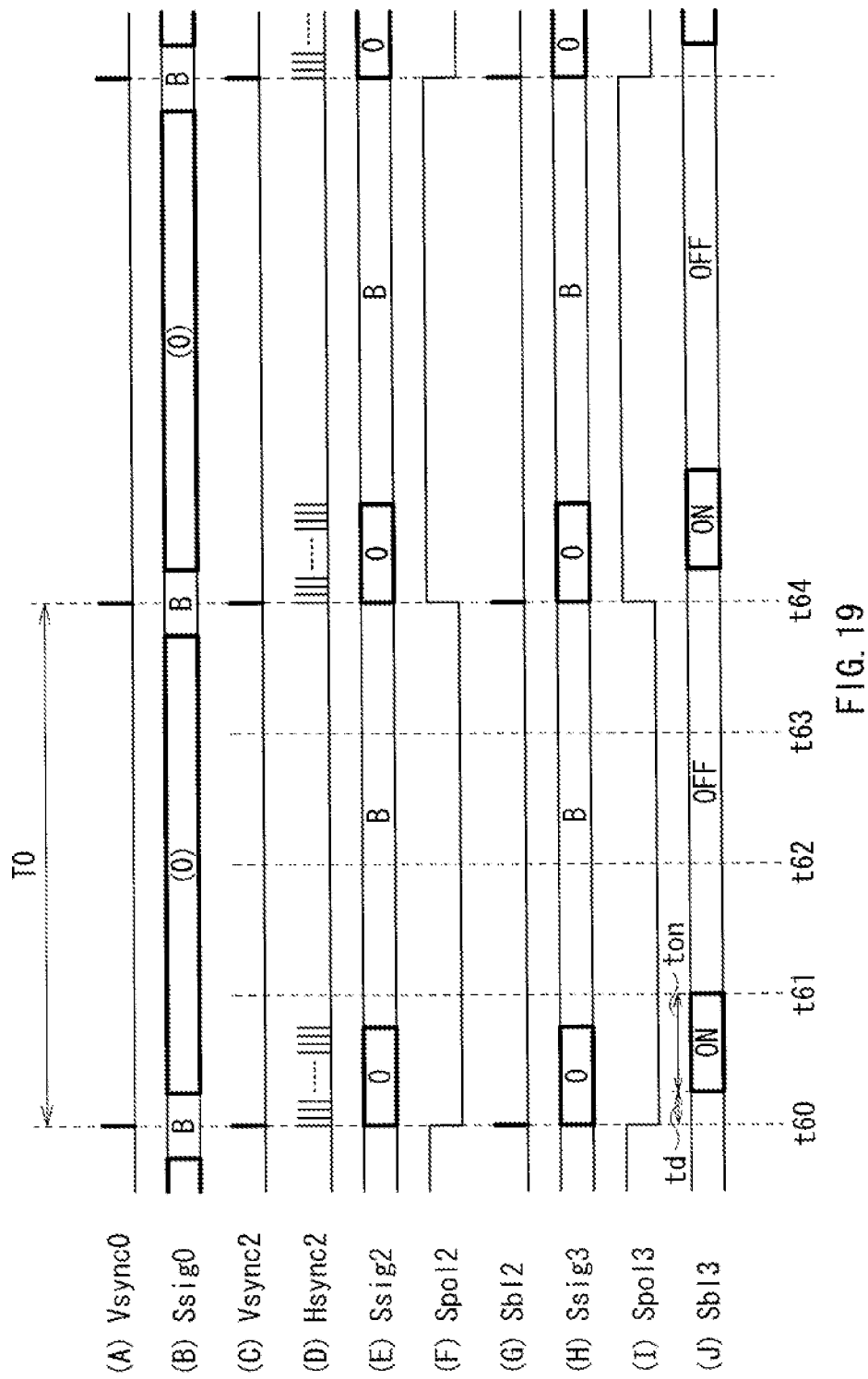
FIG. 19 is a diagram illustrating a timing chart of still another operation example of the display processing section illustrated in FIG. 15.

FIG. 19 illustrates a timing chart of the display processing section 50 in the operation mode M3. Parts (A) and (B) of FIG. 19 illustrate the vertical synchronizing signal Vsync0 and the picture signal Ssig0 of the image signal Sdisp0, respectively. Parts (C) to (E) of FIG. 19 illustrate the vertical synchronizing signal Vsync2, the horizontal synchronizing signal Hsync2, and the picture signal Ssig2 of the image signal Sdisp2, respectively. Part (F) of FIG. 19 illustrates the polarity reference signal Spol2, and Part (G) of FIG. 19 illustrates the backlight reference signal Sbl2. Part (H) of FIG. 19 illustrates the picture signal Ssig3, Part (I) of FIG. 19 illustrates the polarity signal Spol3, and Part (J) of FIG. 19 illustrates the backlight control signal Sbl3.

The frame-rate conversion section 60 sets the frame-rate conversion ratio R2 at 1, based on the operation-mode signal Smode indicating the operation mode M3, and outputs the image signal Sdisp as the image signal Sdisp2 (Parts (C) to (E) of FIG. 19). In other words, the frame-rate conversion section 60 outputs the frame image F as the picture signal Ssig2 in the cycle T0=16.7 [msec] (=1/60 [Hz]). At this time, the frame-rate conversion section 60 outputs the picture signal Ssig2 of the frame image F, in a quarter of the cycle T0 (a period from timing t60 to timing t61).

The reference-signal generation section 51 generates and outputs the polarity reference signal Spol2 that inverts in synchronization with the pulse of the supplied vertical synchronizing signal Vsync2 (Part (F) of FIG. 19). The reference-signal generation section 51 then outputs this vertical synchronizing signal Vsync2 as the backlight reference signal Sbl2 (Part (G) of FIG. 19).

In a manner similar to the first embodiment, the display control section 25 generates and outputs the picture signal Ssig3 (Part (H) of FIG. 19) based on the picture signal Ssig2 of the image signal Sdisp2, and also generates and outputs the polarity signal Spol3 (Part (I) of FIG. 19) based on the polarity reference signal Spol2. The backlight control section 26 generates and outputs the backlight control signal Sbl3 (Part (J) of FIG. 19) based on the backlight reference signal Sbl2, in a manner similar to the first embodiment.

In the present embodiment, as described above, the frame-rate conversion section performs the frame rate conversion by using the frame-rate conversion ratio appropriate to the operation mode. Therefore, only the necessary interpolation frame image F2 is generated and thus, the power consumption is reduced. Other effects are similar to those in the first embodiment.

[Modification 2-1]

In the second embodiment, the reference-signal generation section 51 generates the polarity reference signal Spol2 and the backlight reference signal Sbl2 based on the vertical synchronizing signal Vsync2, but is not limited thereto. Instead, for example, the reference-signal generation section 51 may generate these signals based on the vertical synchronizing signal Vsync2 and the operation-mode signal Smode. The details will be described below.

Figure 20:
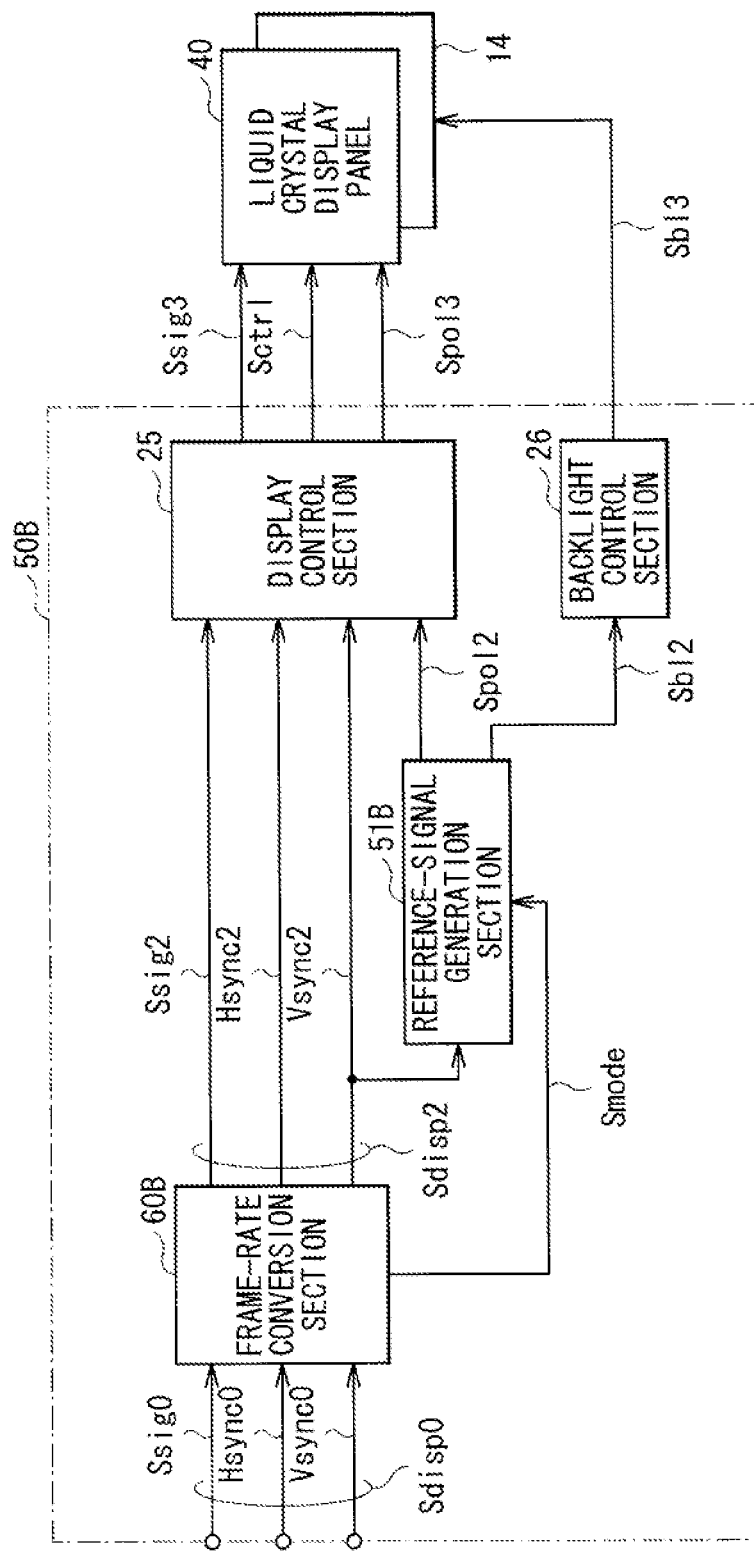
FIG. 20 is a block diagram illustrating a configuration example of the frame-rate conversion section according to a modification of the second embodiment.

FIG. 20 illustrates a configuration example of a display processing section 50B according to the present modification. The display processing section 50B includes a frame-rate conversion section 60B and a reference-signal generation section 51B. The frame-rate conversion section 60B is configured by allowing the operation-mode signal Smode outputted from the operation-mode control section 65 to be also outputted to outside of the frame-rate conversion section 60B, in the frame-rate conversion section 60 illustrated in FIG. 16. The reference-signal generation section 51B generates and outputs the polarity reference signal Spol2 and the backlight reference signal Sbl2, based on the vertical synchronizing signal Vsync2 and the operation-mode signal Smode.

Figure 21:
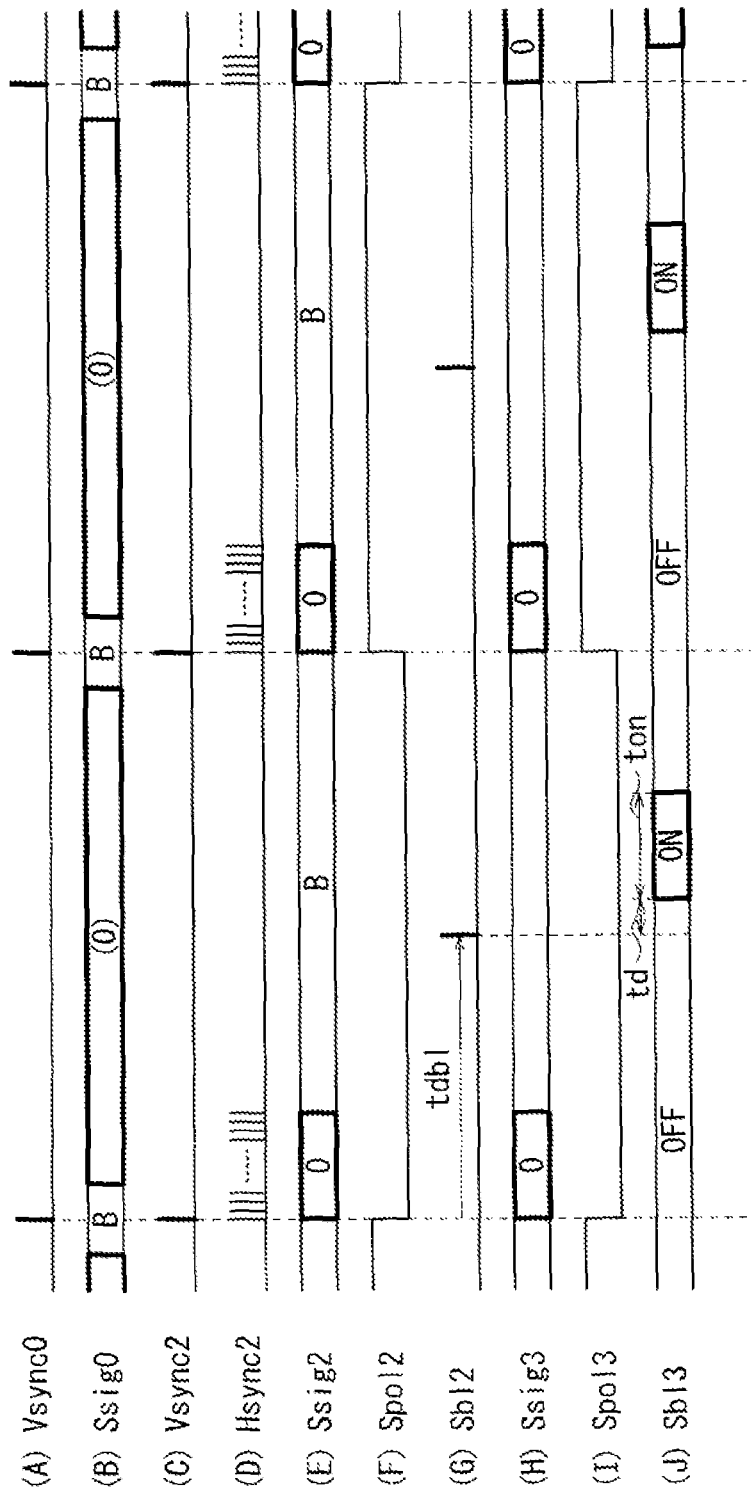
FIG. 21 is a diagram illustrating a timing chart of an operation example of the display processing section illustrated in FIG. 20.

FIG. 21 illustrates a timing chart of the display processing section 50B in the operation mode M3, according to the present modification. Parts (A) and (B) of FIG. 21 illustrate the vertical synchronizing signal Vsync0 and the picture signal Ssig0 of the image signal Sdisp0, respectively. Parts (C) to (E) of FIG. 21 illustrate the vertical synchronizing signal Vsync2, the horizontal synchronizing signal Hsync2, and the picture signal Ssig2 of the image signal Sdisp2, respectively. Part (F) of FIG. 21 illustrates the polarity reference signal Spol2, and Part (G) of FIG. 21 illustrates the backlight reference signal Sbl2. Part (H) of FIG. 21 illustrates the picture signal Ssig3, Part (I) of FIG. 21 illustrates the polarity signal Spol3, and Part (J) of FIG. 21 illustrates the backlight control signal Sbl3.

Based on the motion magnitude A, the operation-mode control section 65 of the frame-rate conversion section 60B determines that the display is to operate in the operation mode M3, and supplies the reference-signal generation section 51B with the operation-mode signal Smode indicating this determination. Based on the operation-mode signal Smode indicating the operation mode M3, the reference-signal generation section 51B then generates the backlight reference signal Sbl2 (Part (G) of FIG. 21) that produces the pulse after a lapse of predetermined time Tbd1 following the pulse of the vertical synchronizing signal Vsync2, in this example. The backlight control section 26 then generates and outputs the backlight control signal Sbl3 (Part (J) of FIG. 21), based on the backlight reference signal Sbl2. In this case, the backlight 14 is lighted at the timing later than that in the case of FIG. 19.

Figure 22:
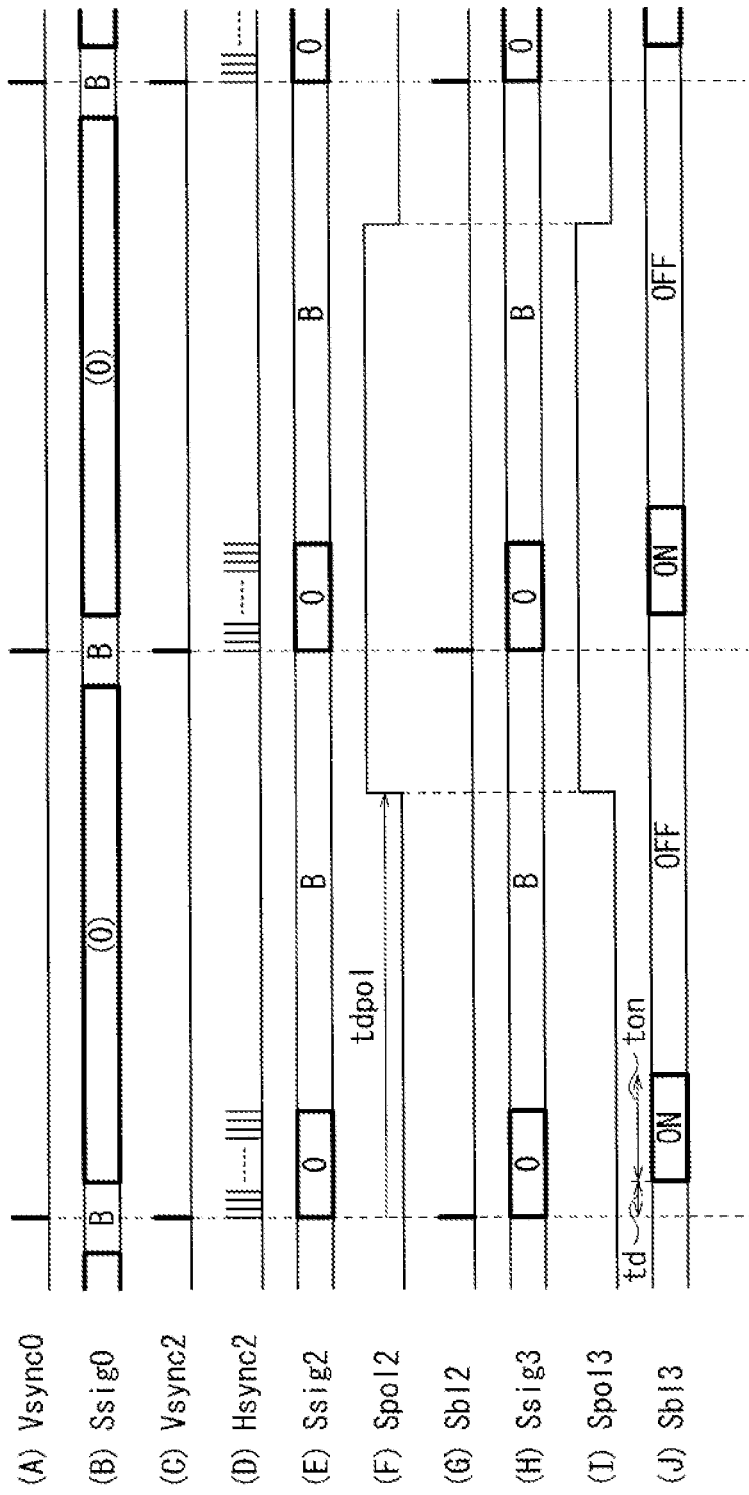
FIG. 22 is a diagram illustrating a timing chart of still another operation example of the display processing section illustrated in FIG. 20.

In the present modification, the reference-signal generation section 51B generates the backlight reference signal Sbl2 based on the vertical synchronizing signal Vsync2 and the operation-mode signal Smode. However, the reference-signal generation section 51B may generate the polarity reference signal Spol2 based on the vertical synchronizing signal Vsync2 and the operation-mode signal Smode, as illustrated in FIG. 22. In this example, based on the operation-mode signal Smode indicating the operation mode M3, the reference-signal generation section 51B generates the polarity reference signal Spol2 (Part (F) of FIG. 22) that inverts after a lapse of predetermined time Tdpo1 following the pulse of the vertical synchronizing signal Vsync2.

[Modification 2-2]

In the second embodiment, the frame-rate conversion section 60 performs the frame rate conversion by generating the interpolation frame images F2, but is not limited thereto. Instead, the frame-rate conversion section 60 may perform the frame rate conversion by repeating the supplied frame image F, in a manner similar to the modification 1-3 of the first embodiment.

(3.) Third Embodiment

Next, a display 3 according to a third embodiment will be described. The present embodiment is configured by modifying the method of controlling the operation mode in the display 1 according to the first embodiment. In other words, the operation mode is controlled based on the motion vector in the first embodiment, but in the present embodiment, the operation mode is controlled based on the content of a program to be displayed. It is to be noted that elements substantially the same as those of the display 1 according to the first embodiment will be provided with the same characters as those of the display 1, and the description will be omitted as appropriate.

Figure 23:
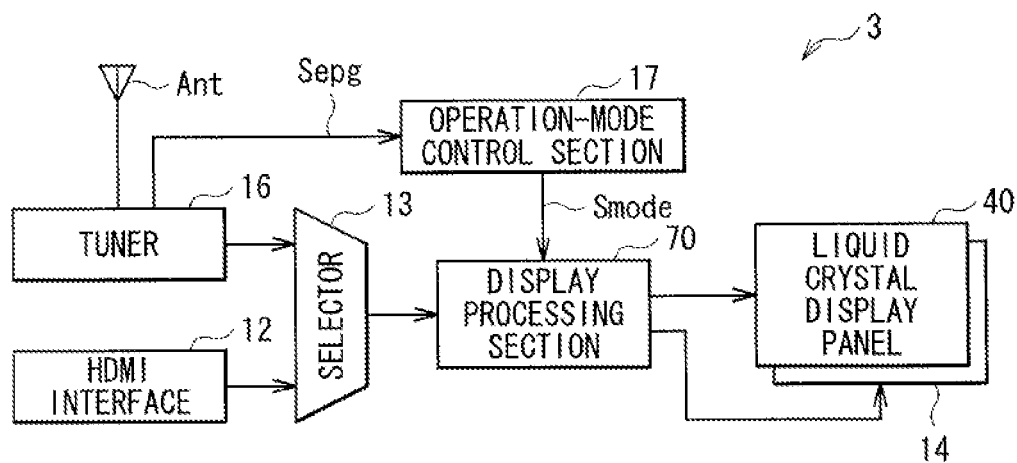
FIG. 23 is a block diagram illustrating a configuration example of a display according to a third embodiment.

FIG. 23 illustrates a configuration example of the display 3 according to the present embodiment. The display 3 includes a tuner 16, an operation-mode control section 17, and a display processing section 70.

The tuner 16 selects a desired image signal (a stream) from a broadcast wave received by an antenna Ant. The tuner 16 also receives an EPG (Electronic Program Guide) signal, and supplies the operation-mode control section 17 with the received EPG signal as an EPG signal Sepg.

Based on the EPG signal Sepg, the operation-mode control section 17 determines one of the operation modes M1 to M3, and thereby outputs a result of the determination as an operation-mode signal Smode.

Figure 24:
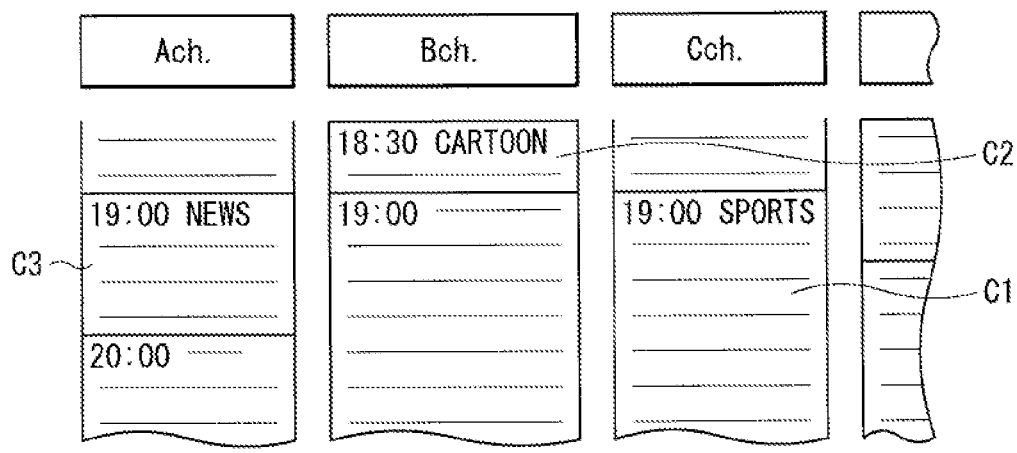
FIG. 24 is an explanatory diagram used to explain operation of an operation-mode control section illustrated in FIG. 23.

FIG. 24 illustrates an example of the electronic program guide according to the received EPG signal. For example, when the content to be displayed is a sports program (a content C1), the operation-mode control section 17 determines that the change of a frame image F is large, and decides that the display 3 is to operate in the operation mode M1. When the content to be displayed is a cartoon show (a content C2), for instance, the operation-mode control section 17 determines that the change of the frame image F is not very large, and decides that the display 3 is to operate in the operation mode M2. When the content to be displayed is a news program (a content C3), for example, the operation-mode control section 17 determines that the change of the frame image F is small, and decides that the display 3 is to operate in the operation mode M3. In this way, in the display 3, the operation mode is determined uniquely by the content, and the operation mode is fixed during a period in which the content is displayed.

The operation-mode control section 21 according to the first embodiment determines one of the operation modes M1 to M3 based on the motion magnitude A of the frame image F. However, the operation-mode control section 17 according to the present embodiment determines one of the operation modes M1 to M3 by indirectly estimating the motion magnitude of the frame image F based on the content, without directly detecting the motion magnitude A of the frame image F.

Figure 25:
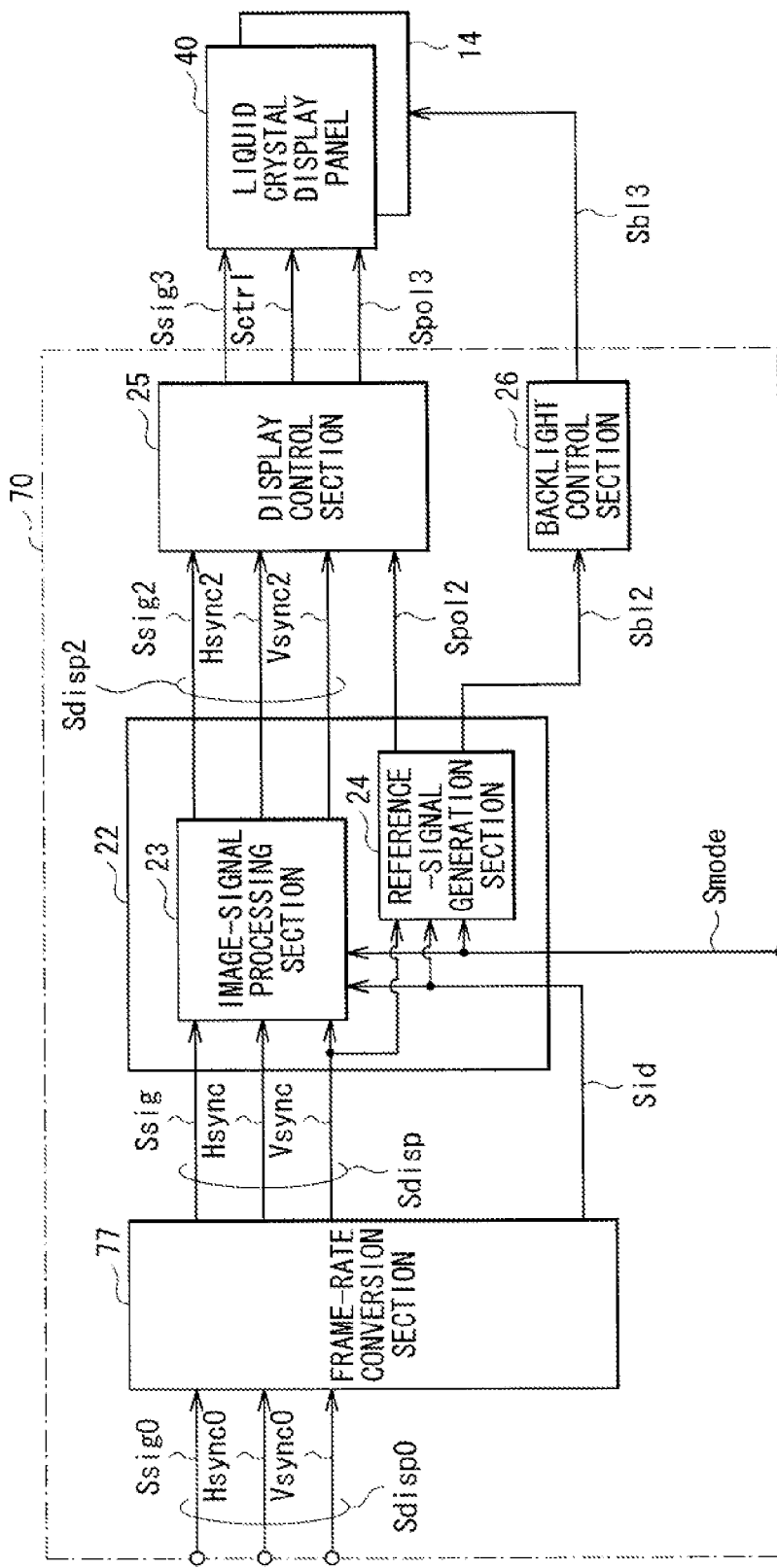
FIG. 25 is a block diagram illustrating a configuration example of a display processing section illustrated in FIG. 23.

FIG. 25 illustrates a configuration example of the display processing section 70. The display processing section 70 includes a frame-rate conversion section 77. The frame-rate conversion section 77 is configured by preventing the motion vector signal Sv outputted from the motion-vector detection section 32 in the frame-rate conversion section 30 (FIG. 4) according to the first embodiment, from being outputted to outside. In the display processing section 70, the operation-mode signal Smode supplied from the operation-mode control section 17 is inputted into a signal processing section 22.

In the present embodiment as described above, the operation mode is determined based on the EPG signal and thus, the determination of the operation mode is simplified.

Further, in the present embodiment, the operation mode is determined based on the content and thus, the operation remains in the same operation mode while the content is displayed, without changing of the operation mode in midstream. Therefore, a viewer is unlikely to perceive the displayed image as unnatural.

Other effects are similar to those in the first embodiment.

[Modification 3-1]

In the third embodiment, the method of controlling the operation mode in the display 1 according to the first embodiment is modified to the method of controlling the operation mode based on the content of the displayed program, although it is not limited thereto. Instead, the method of controlling the operation mode in the display 2 according to the second embodiment may be modified similarly. The details will be described below.

Figure 26:
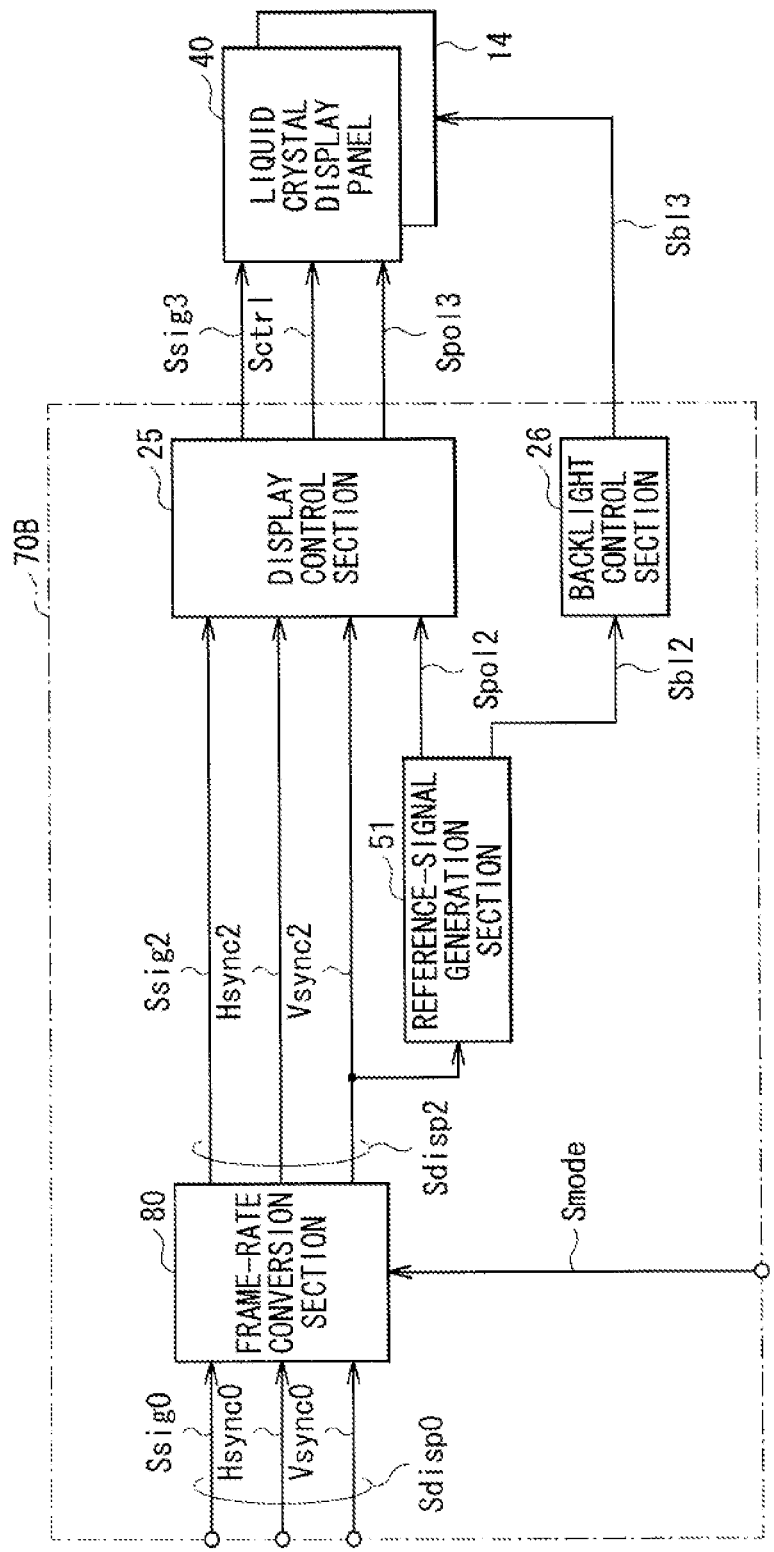
FIG. 26 is a block diagram illustrating a configuration example of the display processing section according to a modification of the third embodiment.

FIG. 26 illustrates a configuration example of a display processing section 70B according to the present modification. The display processing section 70B includes a frame-rate conversion section 80.

Figure 27:
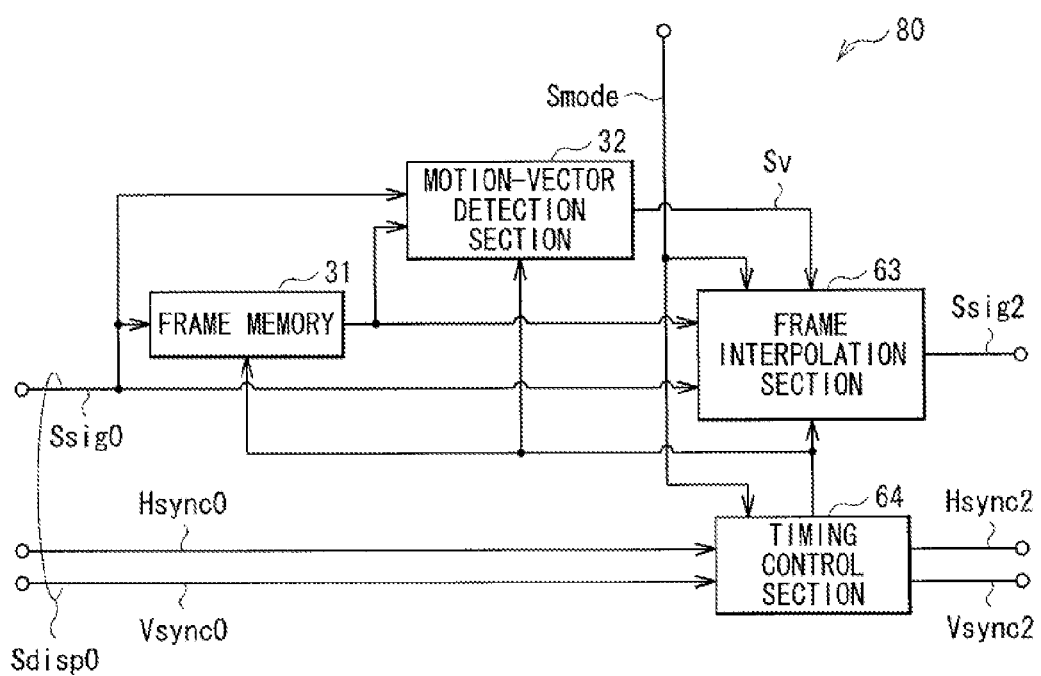
FIG. 27 is a block diagram illustrating a configuration example of a frame-rate conversion section illustrated in FIG. 26.

FIG. 27 illustrates a configuration example of the frame-rate conversion section 80. The frame-rate conversion section 80 is configured by removing the operation-mode control section 65, and supplying the frame interpolation section 63 and the timing control section 64 with the operation-mode signal Smode from outside, in the frame-rate conversion section 60 according to the second embodiment.

The technology has been described with reference to the embodiments and the modifications, but is not limited to these embodiments and modifications, and may be variously modified.

For example, changing from one to another among the operation modes M1 to M3 is based on the motion vector in the first and second embodiments, and is based on the EPG in the third embodiment, although it is not limited thereto. For instance, the operation mode may be changed based on both of the motion vector and the EPG. Specifically, for example, the content of the program to be displayed may be obtained based on the EPG, and the thresholds TH1 and TH2 used to determine the operation modes M1 to M3 may be varied according to the obtained content. To be more specific, when the content to be displayed is the sports program (the content C1), the thresholds TH1 and TH2 are both set at lower values, for instance. As a result, the operation mode M1 is selected for a scene where a game is played, and the operation mode M3 is selected for a scene where a commentator speaks. When the content to be displayed is the news program (the content C3), for example, the thresholds TH1 and TH2 are both set at higher values. This allows the operation mode M3 to be readily selected.

Figure 28:
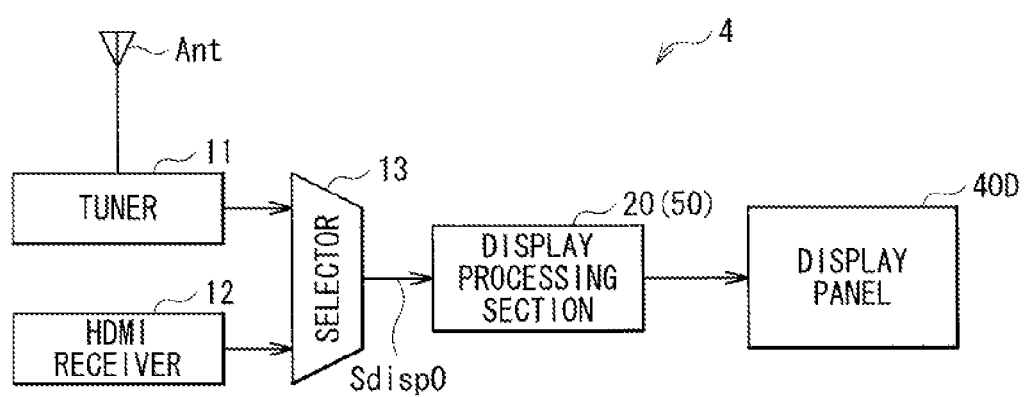
FIG. 28 is a block diagram illustrating a configuration example of the display according to a modification.

Moreover, in the embodiments and the modifications described above, the liquid crystal display panel is used as an example, but the technology is not limited thereto. Instead, for example, a self-luminous display panel such as a plasma display panel may be used as illustrated in FIG. 28. In this case, the backlight control section 26 is removed, and the display control section 25 is configured to output a signal suitable for control of such a display panel.

Accordingly, it is possible to achieve at least the following configurations from the above-described example embodiments and the modifications of the disclosure.

It is possible to achieve at least the following configurations from the above-described example embodiments of the disclosure.

(1) A display including:
a frame-rate conversion section being configured to be capable of changing a frame-rate conversion ratio having a value of 1 or more, the frame-rate conversion section converting a frame rate of an image signal at the frame-rate conversion ratio being set; and
a display section displaying an image having undergone frame rate conversion.

(2) The display according to (1), wherein the frame-rate conversion section outputs a signal portion related to each frame image after frame rate conversion, in a fixed period shorter than a frame period of an original frame image supplied by an image signal.

(3) The display according to (2), wherein the frame-rate conversion section includes:
a first conversion section converting a frame rate at a fixed first conversion ratio greater than 1; and
a second conversion section converting a frame rate at a second conversion ratio having a value of 1 or less, by selectively masking a part of an image signal for every frame image, the image signal being supplied from the first conversion section.

(4) The display according to (3), wherein
the first conversion section generates, by frame interpolation processing, one or more interpolation frame images that is fixed in number for one original frame image, and generates an image signal including the original frame image and the one or more interpolation frame images, and
the second conversion section selectively masks a part of a signal portion related to the one or more interpolation frame images, the signal portion being of the image signal supplied from the first conversion section.

(5) The display according to (4), wherein the second conversion section changes the second conversion ratio, by changing the number of the interpolation frame images to be masked.

(6) The display according to (3), wherein the first conversion section generates one or more replicated frame images that is fixed in number for one original frame image, the one or more replicated frame images being substantially identical to the original frame image, and generates an image signal including the original frame image and the one or more replicated frame images.

(7) The display according to (6), wherein the second conversion section changes the second conversion ratio, by changing the number of the original frame image and the replicated frame images to be masked.

(8) The display according to any one of (3) to (7), wherein
the first conversion section further generates a frame-identification signal that identifies each frame image included in an image signal to be outputted, and
the second conversion section selectively masks a signal portion related to each frame image, based on the frame-identification signal.

(9) The display according to any one of (3) to (8), further including:
an inversion-signal generation section generating an inversion signal inverting for every predetermined period,
wherein the display section undergoes inversion driving based on the inversion signal,
the first conversion section generates a vertical synchronizing signal corresponding to an image signal to be outputted, and
the inversion-signal generation section inverts the inversion signal based on both of the vertical synchronizing signal and the frame-rate conversion ratio.

(10) The display according to any one of (3) to (9), further including:
a backlight repeating lighting and extinction alternately; and
a backlight control section controlling the backlight,
wherein the display section is a liquid crystal display section,
the first conversion section generates a vertical synchronizing signal corresponding to an image signal to be outputted, and
the backlight control section controls the backlight, based on both of the vertical synchronizing signal and the frame-rate conversion ratio.

(11) The display according to (2), wherein when operating at the frame-rate conversion ratio greater than 1, the frame-rate conversion section generates, by frame interpolation processing, one or more interpolation images for original frame image, and generates an image signal including the original frame image and the one or more interpolation frame images.

(12) The display according to (11), wherein the frame-rate conversion section changes the frame-rate conversion ratio, by changing the number of the one or more interpolation frame images.

(13) The display according to (2), wherein when operating at the frame-rate conversion ratio greater than 1, the frame-rate conversion section generates one or more replicated frame images substantially identical to the original frame image, and generates an image signal including the original frame image and the one or more replicated frame images.

(14) The display according to (13), wherein the frame-rate conversion section changes the frame-rate conversion ratio, by changing the number of the one or more replicated frame images.

(15) The display according to any one of (1) to (14), further including:
a motion-vector detection section detecting a motion vector in a series of frame images; and
a conversion-ratio setting section setting the frame-rate conversion ratio, based on the motion vector.

(16) The display according to any one of (3) to (10), further including:
a motion-vector detection section detecting a motion vector in a series of frame images; and
a conversion-ratio setting section setting the second conversion ratio, based on the motion vector.

(17) The display according to (15) or (16), wherein the conversion-ratio setting section
determines a motion magnitude for each frame image, based on the motion vector,
sets the frame-rate conversion ratio at a large value, when the motion magnitude is large, and
sets the frame-rate conversion ratio at a small value, when the motion magnitude is small.

(18) The display according to any one of (1) to (14), further including:
a content detection section detecting a type of an image content; and
a conversion-ratio setting section setting the frame-rate conversion ratio, based on the type of the image content.

(19) The display according to any one of (3) to (10), further including:
a content detection section detecting a type of an image content; and
a conversion-ratio setting section setting the second conversion ratio, based on the type of the image content.

(20) The display according to (18) or (19), wherein the content detection section detects the type of the image content, based on an electronic program guide.

(21) The display according to any one of (1) to (14), further including:
a motion-vector detection section detecting a motion vector in a series of frame images;
a content detection section detecting a type of an image content; and
a conversion-ratio setting section setting the frame-rate conversion ratio, based on both of the motion vector and the type of the image content.

(22) A display method including:
setting a frame-rate conversion ratio having a value of 1 or more, and converting a frame rate of an image signal at the frame-rate conversion ratio; and
displaying an image having undergone frame rate conversion.

It should be understood by those skilled in the art that various modifications, combinations, sub-combinations and alterations may occur depending on design requirements and other factors insofar as they are within the scope of the appended claims or the equivalents thereof.

What is claimed is:

1. A display comprising:
a frame-rate conversion section being configured to be capable of changing a frame-rate conversion ratio having a value of 1 or more, the frame-rate conversion section converting a frame rate of an image signal at the frame-rate conversion ratio being set;
a display section displaying an image having undergone frame rate conversion;
wherein the frame-rate conversion section outputs a signal portion related to each frame image after frame rate conversion, in a fixed period shorter than a frame period of an original frame image supplied by the image signal;
wherein the frame-rate conversion section includes;
a first conversion section converting a frame rate at a fixed first conversion ratio greater than 1; and
a second conversion section converting a frame rate at a second conversion ratio having a value of 1 or less, by selectively masking a part of a second image signal for every frame image, the second image signal being supplied from the first conversion section;
wherein the first conversion section further generates a frame-identification signal that identifies each frame image included in an image signal to be outputted, and
wherein the second conversion section selectively masks a signal portion related to each frame image, based on the frame-identification signal.

2. The display according to claim 1, wherein the frame-rate conversion section outputs a signal portion related to each frame image of an original input image signal after frame rate conversion, in a fixed period shorter than a frame period of a given original frame image supplied by the original input image signal.

3. The display according to claim 1, wherein
the first conversion section generates, by frame interpolation processing, one or more interpolation frame images that is fixed in number for a first original frame image, and generates a second image signal including the first original frame image and the one or more interpolation frame images, and
the second conversion section selectively masks a part of a signal portion, in which the part of the signal portion is at least one selected image of the one or more interpolation frame images, the signal portion being of the second image signal supplied from the first conversion section.

4. The display according to claim 3, wherein the second conversion section changes the second conversion ratio, by changing the number of the interpolation frame images to be masked.

5. The display according to claim 1, wherein when operating at the frame-rate conversion ratio greater than 1, the frame-rate conversion section generates, by frame interpolation processing, one or more interpolation images for the original frame image, and generates a second image signal including the original frame image and the one or more interpolation frame images.

6. The display according to claim 5, wherein the frame-rate conversion section changes the frame-rate conversion ratio, by changing the number of the one or more interpolation frame images.

7. The display according to claim 1, further comprising:
a motion-vector detection section detecting a motion vector in a series of frame images; and
a conversion-ratio setting section setting the frame-rate conversion ratio, based on the motion vector.

8. The display according to claim 1, further comprising:
a motion-vector detection section detecting a motion vector in a series of frame images; and
a conversion-ratio setting section setting the second conversion ratio, based on the motion vector.

9. The display according to claim 7, wherein the conversion-ratio setting section
determines a motion magnitude for each frame image, based on the motion vector,
sets the frame-rate conversion ratio at a large value, when the motion magnitude is large, and
sets the frame-rate conversion ratio at a small value, when the motion magnitude is small.

10. A display method comprising:
changing a frame-rate conversion ratio having a value of 1 or more, and converting a frame rate of an image signal at the frame-rate conversion ratio being set;
displaying an image having undergone frame rate conversion;
outputting a signal portion related to each frame image after frame rate conversion, in a fixed period shorter than a frame period of an original frame image supplied by the image signal;
wherein the converting includes:
a first converting that converts a frame rate at a fixed first conversion ratio greater than 1; and
a second converting that converts a frame rate at a second conversion ratio having a value of 1 or less, by selectively masking a part of a second image signal for every frame image, the second image signal being supplied from the first converting;
wherein the first converting further generates a frame-identification signal that identifies each frame image included in an image signal to be outputted, and
wherein the second converting selectively masks a signal portion related to each frame image, based on the frame-identification signal.

11. The display method according to claim 10, further comprising:
outputting a signal portion related to each frame image of an original input image signal after frame rate conversion, in a fixed period shorter than a frame period of a given original frame image supplied by the original input image signal.

12. The display method according to claim 10, wherein
the first converting generates, by frame interpolation processing, one or more interpolation frame images that is fixed in number for a first original frame image, and generates a second image signal including the first original frame image and the one or more interpolation frame images, and the second converting selectively masks a part of a signal portion, in which the part of the signal portion is at least one selected image of the one or more interpolation frame images, the signal portion being of the second image signal supplied from the first converting.

13. The display according to claim 12, wherein the second converting changes the second conversion ratio, by changing the number of the interpolation frame images to be masked.

14. The display method according to claim 10, wherein when operating at the frame-rate conversion ratio greater than 1, the converting generates, by frame interpolation processing, one or more interpolation images for the original frame image, and generates a second image signal including the original frame image and the one or more interpolation frame images.

15. The display method according to claim 14, wherein the converting changes the frame-rate conversion ratio, by changing the number of the one or more interpolation frame images.

16. The display method according to claim 10, further comprising:
detecting a motion vector in a series of frame images; and
setting the frame-rate conversion ratio, based on the motion vector.

17. The display method according to claim 10, further comprising:
detecting a motion vector in a series of frame images; and
setting the second conversion ratio, based on the motion vector.

18. The display according to claim 16, further comprising:
determining a motion magnitude for each frame image, based on the motion vector,
setting the frame-rate conversion ratio at a large value, when the motion magnitude is large, and
setting the frame-rate conversion ratio at a small value, when the motion magnitude is small.

* * * * *